(12) United States Patent
Sio et al.

(10) Patent No.: US 12,230,624 B2
(45) Date of Patent: *Feb. 18, 2025

(54) INTEGRATED CIRCUIT WITH MIXED ROW HEIGHTS

(71) Applicant: Taiwan Semiconductor Manufacturing Co., Ltd., Hsinchu (TW)

(72) Inventors: Kam-Tou Sio, Zhubei (TW); Jiann-Tyng Tzeng, Hsin-Chu (TW); Chung-Hsing Wang, Hsin-Chu (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,759

(22) Filed: Aug. 10, 2023

(65) Prior Publication Data

US 2024/0006406 A1 Jan. 4, 2024

Related U.S. Application Data

(63) Continuation of application No. 17/585,402, filed on Jan. 26, 2022, now Pat. No. 11,769,766, which is a
(Continued)

(51) Int. Cl.
| | | |
|---|---|---|
| H01L 27/02 | (2006.01) | |
| H01L 27/092 | (2006.01) | |
| G06F 111/20 | (2020.01) | |

(52) U.S. Cl.
CPC ...... *H01L 27/0207* (2013.01); *H01L 27/0924* (2013.01); *G06F 2111/20* (2020.01)

(58) Field of Classification Search
CPC ........... H01L 27/0207; H01L 27/11807; H01L 29/785; H01L 2027/11855; G06F 30/30; G06F 2111/04; G06F 2111/20
See application file for complete search history.

(56) References Cited

U.S. PATENT DOCUMENTS

| 11,152,348 B2 * | 10/2021 | Sio ...................... G06F 30/30 |
| 11,282,829 B2 * | 3/2022 | Sio ...................... G06F 30/39 |

(Continued)

FOREIGN PATENT DOCUMENTS

| JP | 2014235116 A | 12/2014 |
| KR | 101789881 B1 | 10/2017 |

(Continued)

OTHER PUBLICATIONS

Official Action issued Oct. 16, 2019, in corresponding Taiwan Patent Application No. 10820949040.

*Primary Examiner* — Andres Munoz
*Assistant Examiner* — Neil R Prasad
(74) *Attorney, Agent, or Firm* — Duane Morris LLP

(57) ABSTRACT

An integrated circuit structure includes: an integrated circuit structure includes: a first plurality of cell rows extending in a first direction, and a second plurality of cell rows extending in the first direction. Each of the first plurality of cell rows has a first row height and comprises a plurality of first cells disposed therein. Each of the second plurality of cell rows has a second row height different from the first row height and comprises a plurality of second cells disposed therein. The plurality of first cells comprises a first plurality of active regions each of which continuously extends across the plurality of first cells in the first direction. The plurality of second cells comprises a second plurality of active regions each of which continuously extends across the plurality of second cells in the first direction. At least one active region of the first and second pluralities of active regions has a width varying along the first direction.

20 Claims, 27 Drawing Sheets

Related U.S. Application Data continuation of application No. 16/883,740, filed on May 26, 2020, now Pat. No. 11,282,829, which is a continuation-in-part of application No. 16/196,434, filed on Nov. 20, 2018, now Pat. No. 11,152,348.

(60) Provisional application No. 62/591,358, filed on Nov. 28, 2017.

(56) References Cited

U.S. PATENT DOCUMENTS

| | | | |
|---|---|---|---|
| 11,769,766 B2* | 9/2023 | Sio | G06F 30/39 |
| | | | 257/369 |
| 2008/0111158 A1 | 5/2008 | Sherlekar et al. | |
| 2009/0052251 A1 | 2/2009 | Kang et al. | |
| 2011/0049575 A1* | 3/2011 | Tanaka | H01L 27/11807 |
| | | | 257/E27.013 |
| 2012/0286858 A1 | 11/2012 | Biggs et al. | |
| 2014/0181774 A1 | 6/2014 | Hatamian et al. | |
| 2014/0327471 A1 | 11/2014 | Hsieh et al. | |
| 2015/0137252 A1 | 5/2015 | Baek et al. | |
| 2017/0194349 A1 | 7/2017 | Chen et al. | |

FOREIGN PATENT DOCUMENTS

| | | |
|---|---|---|
| TW | 200913234 A | 3/2009 |
| TW | 201520800 A | 6/2015 |

* cited by examiner

INTEGRATED CIRCUIT WITH MIXED ROW HEIGHTS

CROSS-REFERENCE TO RELATED APPLICATIONS

This application is a continuation of U.S. Pat. No. 17,585,402, filed Jan. 26, 2022, which is a continuation of U.S. patent application Ser. No. 16/883,740, filed on May 26, 2020, which is a continuation-in-part of U.S. patent application Ser. No. 16/196,434, filed on Nov. 20, 2018, now U.S. Pat. No. 11,152,348, which claims priority to U.S. Provisional Patent Application No. 62/591,358, filed on Nov. 28, 2017, each of which is incorporated by reference herein in their entireties.

BACKGROUND

Generally, electronic design automation (EDA) tools assist semiconductor designers to take a purely behavioral description of a desired circuit and work to fashion a finished layout of the circuit ready to be manufactured. This process usually takes the behavioral description of the circuit and turns it into a functional description, which is then decomposed into thousands of Boolean functions and mapped into respective cell rows using a standard cell library. Once mapped, a synthesis is performed to turn the structural design into a physical layout, a clock tree is built to synchronize the structural elements, and the design is optimized post layout.

In order to avoid misalignment across cells from respective different cell libraries, a cell from a standard cell library is typically used, which has a cell height equal to the height of the cell row (hereinafter "row height"). As such, a decision is typically made at a relatively early design stage as to which "single" cell height to utilize for the design thereby fixing the corresponding row height as well. By using only a single cell height, however, some compromises between circuit performance, circuit power, and the manufacturing process must be made. For example, a performance-orientated circuit may be formed by disposing a plurality of cells side-by-side along a cell row, each of which has a higher number of active regions (e.g., fins); and a power/area-orientated circuit may be formed by disposing a plurality of cells side-by-side along a cell row, each of which has a lower number of active regions.

Accordingly, in order to design a circuit required to consume low power and occupy a small area without sacrificing its performance (e.g., a balance-orientated circuit), various design compromises are typically made. For example, a first plurality of cells having a lower number of fins are alternatively disposed between a second plurality of cells having a higher number of active regions. Such a layout causes a discontinuity on the extension of one or more of the active regions (typically known as "broken fins," or more generally, "broken active regions") in the second plurality of cells, which can disadvantageously lower the performance of the circuit (due to the relaxed strain/stress caused by the broken fins). Thus, conventional techniques to design a circuit using cells are not entirely satisfactory.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1A:
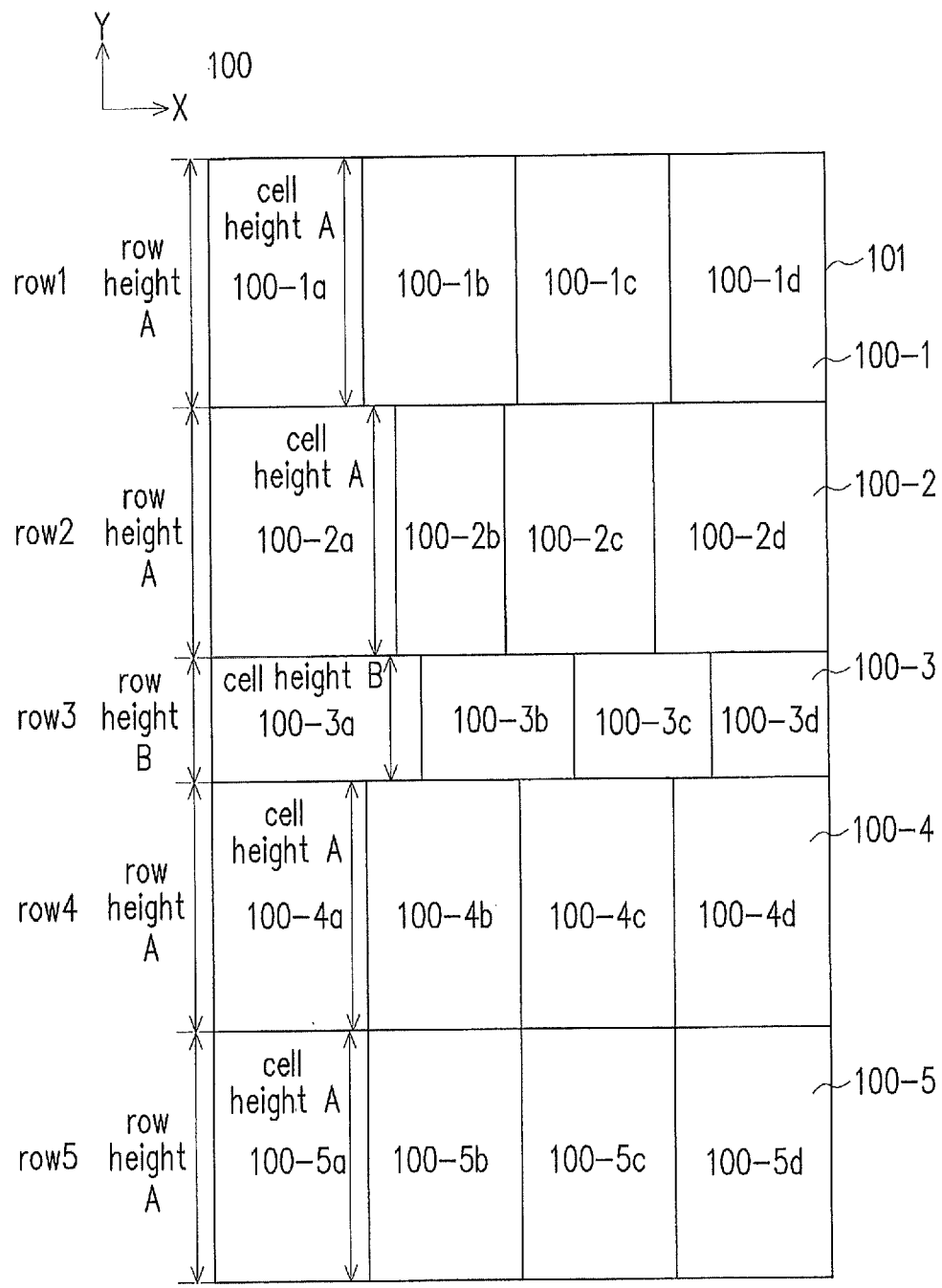
FIGS. 1A, 1B, and 1C respectively illustrate schematic diagrams of exemplary integrated circuits designed by systems and methods of the present disclosure, in accordance with some embodiments of the present disclosure.

The following disclosure describes various exemplary embodiments for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides various embodiments of systems and methods to design a circuit using a plurality of cell rows, or rows, each of which includes one or more cells that are disposed side-by-side along a first direction and each has a same number of active regions (e.g., fins) extending along the first direction. More specifically, the respective active regions, disposed within each row, each continuously extends across the one or more cells. Further, according to some embodiments, such a plurality of rows can be disposed along a second direction substantially orthogonal to the first direction, and may have at least two respective different row heights. In other words, the cells disposed within the respective rows having the different row heights have different numbers of active regions. As such, various circuits, each of which can be used in respective different applications (e.g., a performance-orientated application, a power/area-orientated application, a balance-orientated application, etc.) can be designed using the disclosed systems and methods without having the broken fin issue typically encountered by existing techniques, as mentioned above.

A conventional single digital design block can have three scenarios: (1) high performance (HP) application with tall cells, high speed, high power and large area; (2) low power (LP) application with short cells, low power, small area and low speed; and (3) a balance application with tall cells, medium speed, low power and large area. The present disclosure provides various embodiments of systems and methods to show an efficient way to optimize a balance application, by mixing HP and LP cells to obtain a smaller area. These embodiments can be applied in a planar, a fin field-effect transistor (FinFET), or next generation devices such as gate-all-around (GAA) nano-sheet or nano-wire. In a disclosed hybrid row structure, the HP to LP row ratio can be flexible for different applications. According to a row ratio, some filler cells may be placed after functional cells are placed with flexible active region width and/or flexible sheet width for both HP and LP cells in a planar or nano-sheet. For a FinFET or nano-wire, HP and LP cells may be placed with flexible fin number and/or flexible wire number according to a row ratio. In some embodiments, active regions on different rows may be merged with flexile active region transition from one cell to another.

Figure 1B:
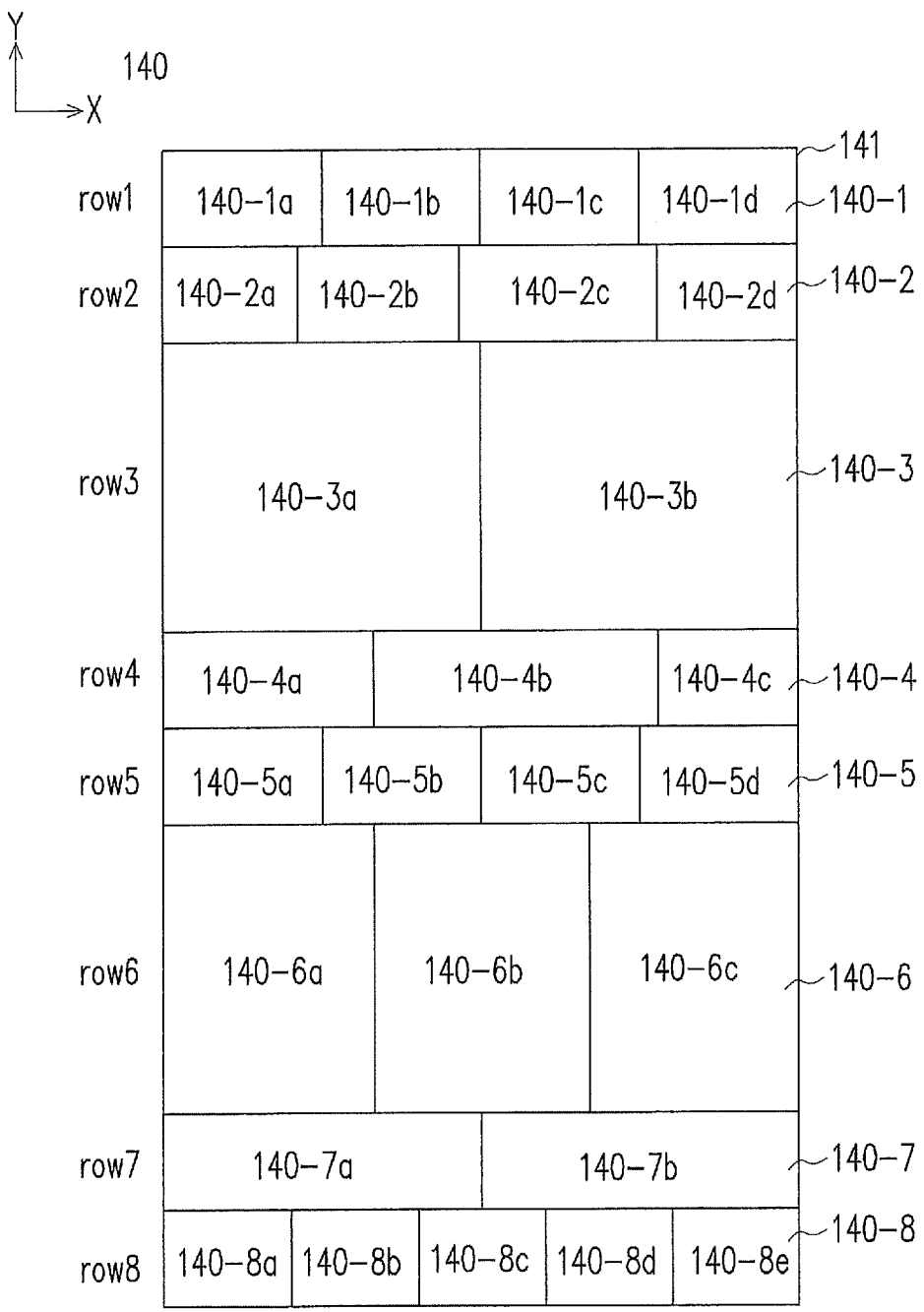
Figure 1C:
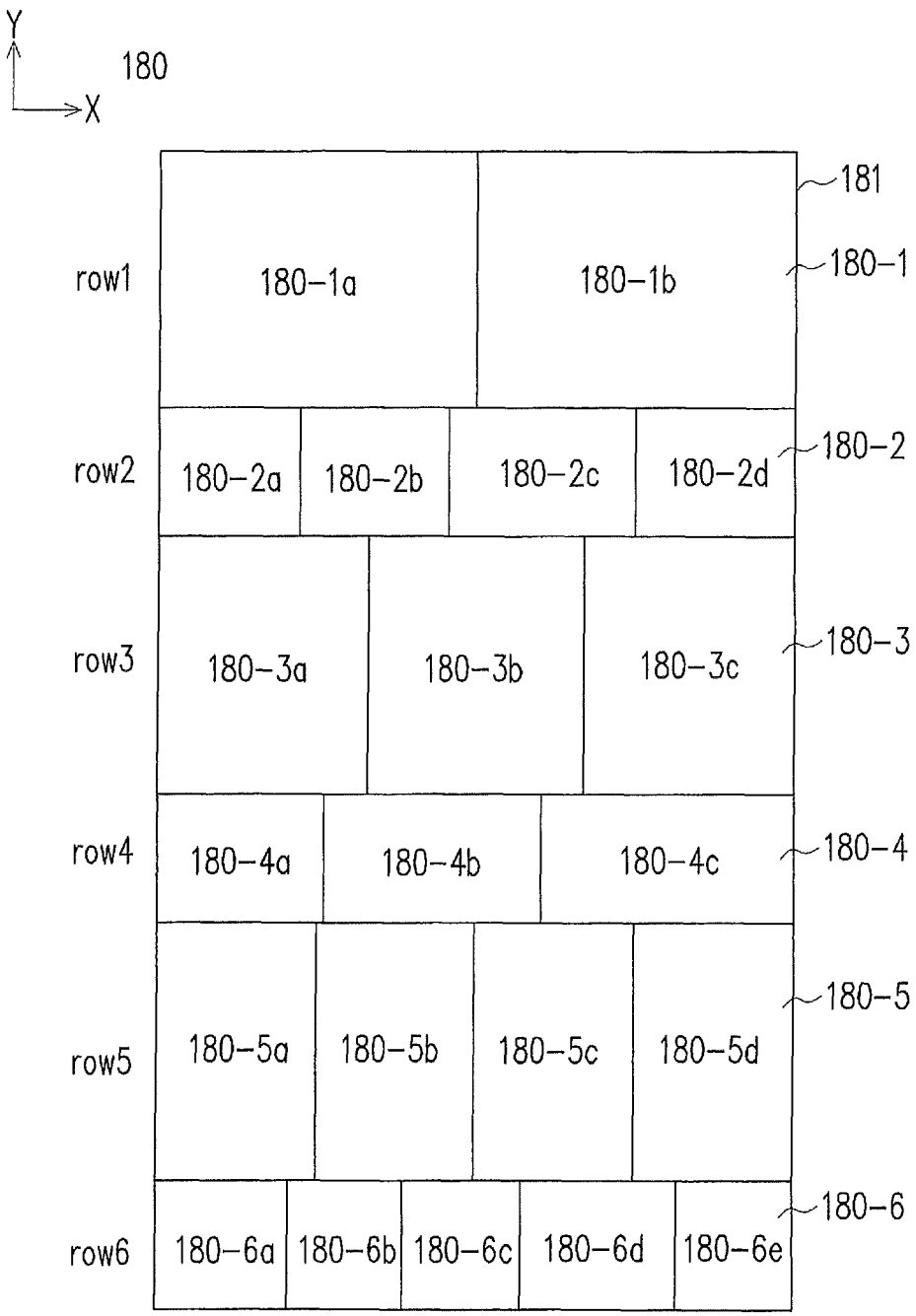

FIGS. 1A, 1B, 1C respectively illustrate schematic diagrams of exemplary integrated circuits 100, 140, and 180 designed by systems and methods of the present disclosure, in accordance with some embodiments. Not all of the illustrated components are required, however, and some embodiments of the present disclosure may include additional components not shown in FIGS. 1A-C. Variations in the arrangement and type of the components may be made without departing from the scope of the present disclosure as set forth herein. Additional, different or fewer components may be included.

Referring first to FIG. 1A, the integrated circuit 100 includes cell groups 100-1, 100-2, 100-3, 100-4, and 100-5 arranged (e.g., laid out) in respective "cell rows" or "rows" with respect to a grid 101. Further, in some embodiments, each cell group includes one or more (standard) cells disposed side-by-side along the respective row. For example, the cell group 100-1 including cells 100-1a, 100-1b, 100-1c, and 100-1d that are arranged in row 1 of the grid 101; the cell group 100-2 including cells 100-2a, 100-2b, 100-2c, and 100-2d that are arranged in row 2 of the grid 101; the cell group 100-3 including cells 100-3a, 100-3b, 100-3c, and 100-3d that are arranged in row 3 of the grid 101; the cell group 100-4 including cells 100-4a, 100-4b, 100-4c, and 100-4d that are arranged in row 4 of the grid 101; and the cell group 100-5 including cells 100-5a, 100-5b, 100-5c, and 100-5d that are arranged in row 5 of the grid 101.

In some embodiments, the rows of the integrated circuit 100 may present at least two respective different "row heights." As shown, the rows 1, 2, 4, and 5 may share a substantially similar row height, hereinafter "row height A;" and the row 3 may have a row height, hereinafter "row height B," wherein the row height A is greater than the row height B. In some embodiments, such a row height corresponds to the cell height of a cell placed therein, which will be discussed as follows.

In some embodiments, the cells of the cell groups 100-1, 100-2, 100-3, 100-4, and 100-5 are retrieved from respective standard cell libraries having different cell heights. More specifically, the cells of the cell groups 100-1, 100-2, 100-4, and 100-5 may be retrieved from a first standard cell library (hereinafter "cell library A") including a plurality of cells, each of which share a first cell height (hereinafter "cell height A"); and the cells of the cell group 100-3 may be retrieved from a second standard cell library (hereinafter "cell library B") including a plurality of cells, each of which share a second cell height (hereinafter "cell height B"). Alternatively stated, the cells 100-1a to 100-1d, 100-2a to 100-2d, 100-4a to 100-4d, and 100-5a to 100-5d are a subset of the cell library A, and the cells 100-3a to 100-3d are a subset of the cell library B. Each of the cells 100-1a to 100-1d, 100-2a to 100-2d, 100-4a to 100-4d, and 100-5a to 100-5d in the cell library A and the cells 100-3a to 100-3d in the cell library B is associated with a specific logic function and/or characteristic (e.g., a timing characteristic). Accordingly, it is noted that although the cells 100-1a to 100-1d, 100-2a to 100-2d, 100-4a to 100-4d, and 100-5a to 100-5d are retrieved from the cell library A, not all of them share a same cell width, for which the cells 100-3a to 100-3d of the cell library B are similar. In some embodiments, by arranging the cell groups 100-1 to 100-5 as shown, the integrated circuit 100 may present a specific characteristic, e.g., a speed-orientated circuit, a balance-orientated circuit, or a power/area-orientated circuit, which will be discussed in further detail below.

As mentioned above, the row height of each row corresponds to the cell height of a cell placed therein. In some embodiments, the row height of each row is substantially close to the cell height of the cell placed therein. Further, the cell height of each of the cells of the cell groups 100-1 to 100-5 may correspond to a number of active region(s) continuously running in a first direction (e.g., the X direction) and disposed along a second direction (e.g., the Y direction). In some embodiments, such an active region may be a fin-shaped region of one or more three-dimensional field-effect-transistors (e.g., FinFETs, gate-all-around (GAA) transistors), or an oxide-definition (OD) region of one or more planar metal-oxide-semiconductor field-effect-transistors (MOSFETs), wherein the active region may serve as a source feature or drain feature of the respective transistor(s). For example, the cell height A of the cells 100-1a to 100-d, 100-2a to 100-2d, 100-4a to 100-4d, and 100-5a to 100-5d may correspond to a higher number of active regions disposed along the Y direction; and the cell height B of the cells 100-3a to 103-d may correspond to a lower number of active regions along the Y direction, which will be shown and discussed below in further detail with respect to FIG. 2A.

Referring to FIG. 1B, the integrated circuit 140 includes cell groups 140-1, 140-2, 140-3, 140-4, 140-5, 140-6, 140-7, and 140-8 arranged (e.g., laid out) in respective "rows" with respect to a grid 141. For example, the cell group 140-1 including cells 140-1a, 140-1b, 140-1c, and 140-1d that are arranged in row 1 of the grid 141; the cell group 140-2 including cells 140-1a, 140-2b, 140-2c, and 140-2d that are arranged in row 2 of the grid 141; the cell group 140-3 including cells 140-3a and 140-3b that are arranged in row 3 of the grid 141; the cell group 140-4 including cells 140-4a, 140-4b and 140-4c that are arranged in row 4 of the grid 141; the cell group 140-5 including cells 140-5a, 140-5b, 140-5c, and 140-5d that are arranged in row 5 of the grid 141; the cell group 140-6 including cells 140-6a, 140-6b, and 140-6c that are arranged in row 6 of the grid 141; the cell group 140-7 including cells 140-7a and 140-7b that are arranged in row 7 of the grid 141; and the cell 140-8 including cells 140-8a, 140-8b, 140-8c, 140-8d, and 140-8e that are arranged in row 8 of the grid 141. In some embodiments, the cells of the cell groups 140-1, 140-2, 140-4, 140-5, 140-7, and 140-8 may be retrieved from the above-mentioned standard cell library B (e.g., same as the cell 100-3a to 100-3d of the integrated circuit 100); and the cells of the cell groups 140-3 and 140-6 may be retrieved from the above-mentioned standard cell library A (e.g., same as the cells 100-1a to 100-1d of the integrated circuit 100). In some embodiments, the rows 1, 2, 4, 5, 7, and 8 of the integrated circuit 140 may each have a row height substantially similar to the row height B; and the rows 3 and 6 of the integrated circuit 140 may each have a row height substantially similar to the row height A. As such, the cells 140-1a to 140-1d, 140-2a to 140-2d, 140-4a to 140-c, 140-5a to 140-5d, 140-7a to 140-7b, and 140-8a to 140-8e may each have a cell height that is substantially identical to the cell height B; and the cells 140-3a to 140-3b and 140-6a to 140-6c may each have a cell height that is substantially identical to the cell height A.

Referring then to FIG. 1C, the integrated circuit 180 includes cell groups 180-1, 180-2, 180-3, 180-4, 180-5, and 180-6 arranged (e.g., laid out) in respective "rows" with respect to a grid 181. For example, the cell group 180-1 including cells 180-1a and 180-1b that are arranged in row 1 of the grid 181; the cell group 180-2 including cells 180-2a, 180-2b, 180-2c, and 180-2d that are arranged in row 2 of the grid 181; the cell group 180-3 including cells 180-3a, 180-3b, and 180-3c that are arranged in row 3 of the grid 181; the cell group 180-4 including cells 180-4a, 180-4b, and 180-4c that are arranged in row 4 of the grid 181; the cell group 180-5 including cells 180-5a, 180-5b, 180-5c, and 180-5d that are arranged in row 5 of the grid 181; and the cell group 180-6 including cells 180-6a, 180-6b, 180-6c, 180-6d, and 180-6e that are arranged in row 6 of the grid 181. In some embodiments, the cells of the cell groups 180-1, 180-3, and 180-5 may be retrieved from the above-mentioned standard cell library A; and the cells of the cell groups 180-2, 180-4, and 180-6 may be retrieved from the above-mentioned standard cell library B. In some embodiments, the rows 1, 3, and 5 of the integrated circuit 180 may each have a row height substantially similar to the row height A; and the rows 2, 4, and 6 of the integrated circuit 180 may each have a row height substantially similar to the row height B. As such, the cells ith some embodiments of the present disclosure. substantially identical to the cell height A; and the cells 180-2a to 180-2d, 180-4a to 180-4c, and 180-6a to 180-6e may each have a cell height that is substantially identical to the cell height B.

As discussed above, the cell height A corresponds to a higher number of active regions disposed along the Y direction, and the cell height B corresponds to a lower number of active regions disposed along the Y direction. Further, in some embodiments, the cell that has a higher number of active regions may present higher performance (e.g., a faster speed) over the cell that has a lower number of active regions, while the cell that has a lower number of active regions may occupy a smaller area, which typically presents lower power consumption as well, over the cell that has a higher number of active regions.

As such, the integrated circuit 100, which includes more cells with the cell height A than one(s) with the cell height B, may present relatively higher performance among the integrated circuits 100-180 (i.e., a speed-orientated circuit); the integrated circuit 140, which includes more cells with the cell height B than ones with the cell height A, may present relatively lower power consumption among the integrated circuits 100-180 (i.e., a power/area-orientated circuit); and the integrated circuit 180, which includes equal numbers of cells with the cell heights A and B, may present relatively higher performance than the integrated circuit 180 and relatively lower power consumption than the integrated circuit 100 (i.e., a balance-orientated circuit). Compared to the existing techniques to form a balance-orientated circuit, which typically has extension discontinuity in one or more respective active regions, the integrated circuit 180, for example, which is formed by the disclosed systems and methods, can present a balanced characteristic without having the extension discontinuity formed in the respective active regions.

More specifically, depending on the characteristic of a being-designed integrated circuit, a row ratio, defining a ratio of the number of cells having the cell height A to the number of cells having the cell height B, can be accordingly determined, in accordance with some embodiments of the present disclosure. Using the above-provided integrated circuits for example, while designing the integrated circuit 100 that is intended to have high performance using the disclosed systems and methods, a higher row ratio, which is 4 (because the numbers of cells with cell heights A and B are 4 and 1, respectively), may be determined; while designing the integrated circuit 140 that is intended to have lower power consumption using the disclosed systems and methods, a lower row ratio, which is 1/3 (because the numbers of cells with cell heights A and B are 2 and 6, respectively), may be determined; and while designing the integrated circuit 180 that is intended to have a balanced characteristic using the disclosed systems and methods, an intermediate row ratio, which is 1 (because the numbers of cells with cell heights A and B are 3 and 3, respectively), may be determined. The integrated circuits 100-180 are provided as illustrative examples. Thus, it is understood that the disclosed systems and methods can be used to design an integrated circuit that has any of other row ratios (after reduced a fraction to respective lowest terms) such as, for example, 1/2, 2/3, 3/2, 1/4, 3, 4, etc., while remaining within the scope of the present disclosure.

In accordance with some embodiments of the present disclosure, integrated circuits designed by the disclosed systems and methods include a plurality of rows, and each of the plurality of rows includes one or more side-by-side disposed cells sharing a same cell height. Further, such a same height corresponds to a same number of active regions, across those side-by-side disposed cells, that runs in a direction substantially orthogonal to another direction along which the plurality of rows are arranged. As such, the active regions of the side-by-side disposed cells can be continuously extended across the respective cells along the row. By continuously extending the active regions across plural side-by-side cells of an integrated circuit, the compressive strain within the active regions can be increased, which can advantageously improve performance of the integrated circuit (e.g., a higher driving current), while allowing the integrated circuit to be designed to have any desired characteristic by arranging two or more rows that have respective different row heights (cell heights), as discussed above. Using the integrated circuit 180 as a representative example, such continuously extending active regions will be illustrated and discussed in further detail below.

In addition, integrated circuits following a mixed row design of the disclosed systems and methods can achieve a smaller area, a lower power consumption on non-timing critical path, while keeping the fin speed. In one example, compared to a traditional high speed design, the disclosed integrated circuit has a same top speed, but reduces power to 70%, reduces the area to 87%, and is strong against fin stress with no fin break. In another example, compared to a traditional low power design, the disclosed integrated circuit has a same power, a similar area, but increases the top speed from 70% to 100% (by about 43%), and is strong against fin stress with no fin break. In yet another example, compared to a traditional high speed and partial low power design, the disclosed integrated circuit has a same power, but increases the top speed from 90% to 100% (by about 11%), reduces the area to 87%, and is relatively strong against fin stress with no fin break.

Figure 2A:
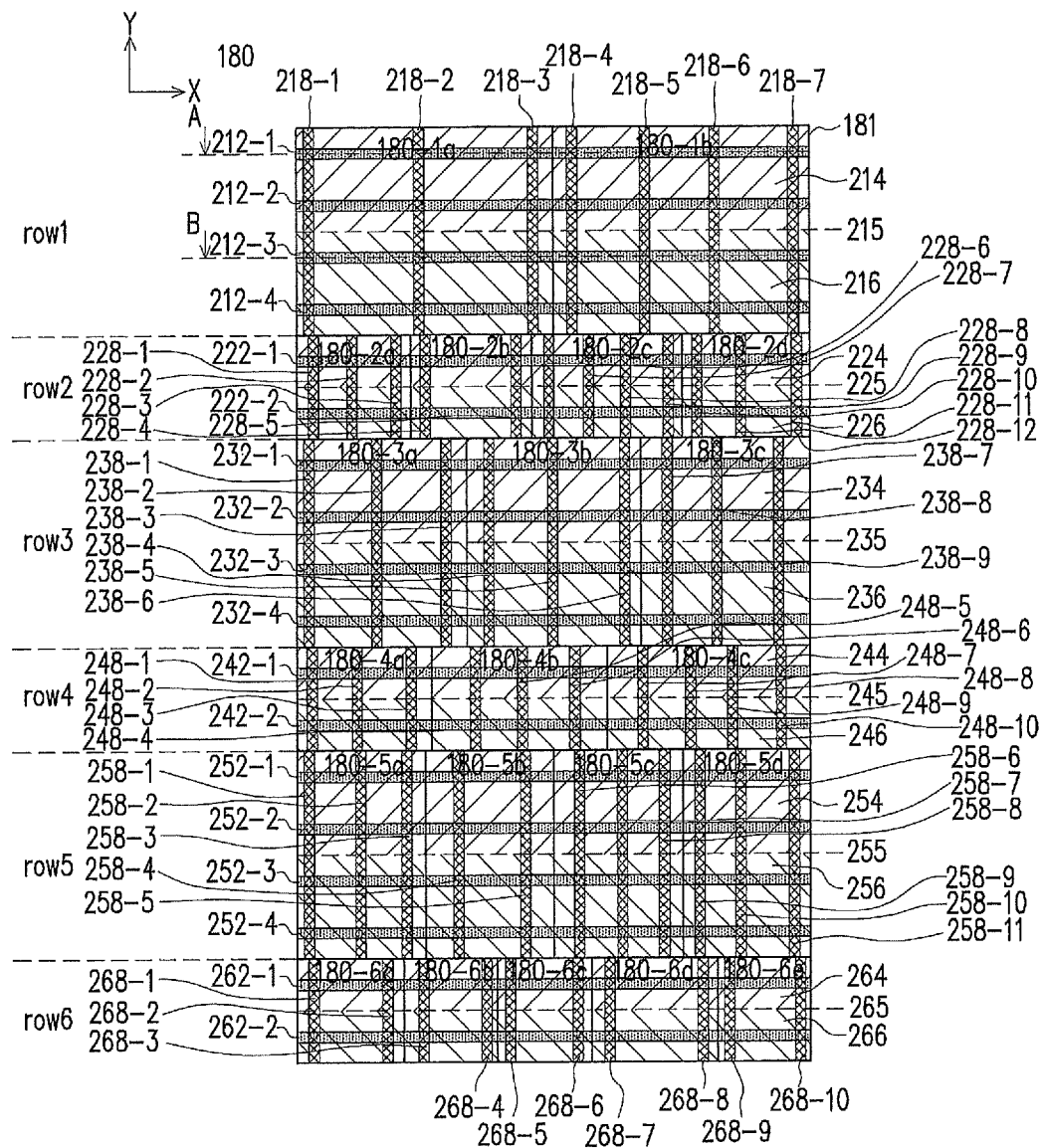
FIG. 2A illustrates a top view of a corresponding layout design of an exemplary integrated circuit at one or more first layout levels, in accordance with some embodiments of the present disclosure.
Figure 2B:
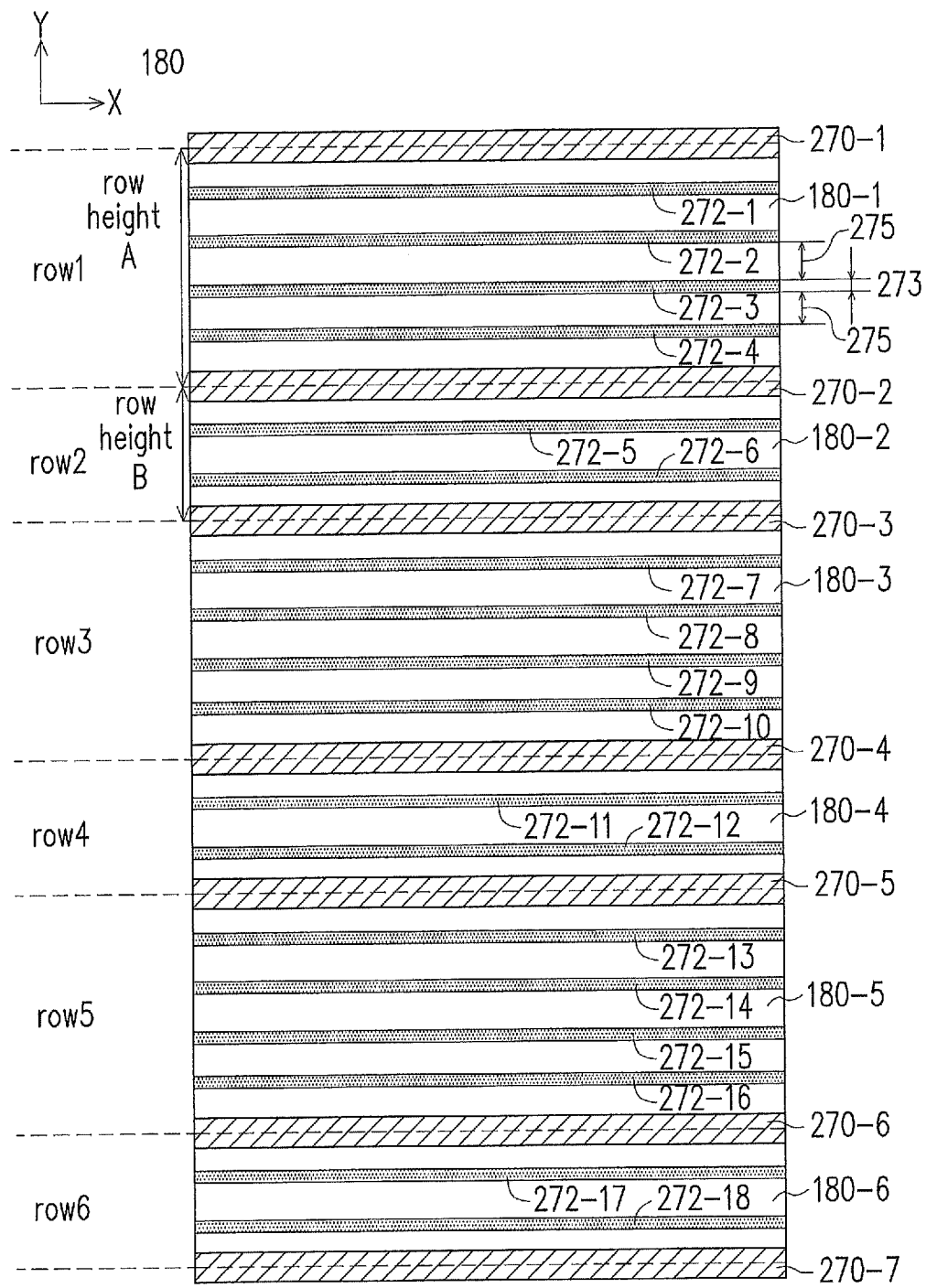
FIG. 2B illustrates a top view of the corresponding layout design of the integrated circuit at a second layout level above the one or more first layout levels, in accordance with some embodiments of the present disclosure.
Figure 2C:
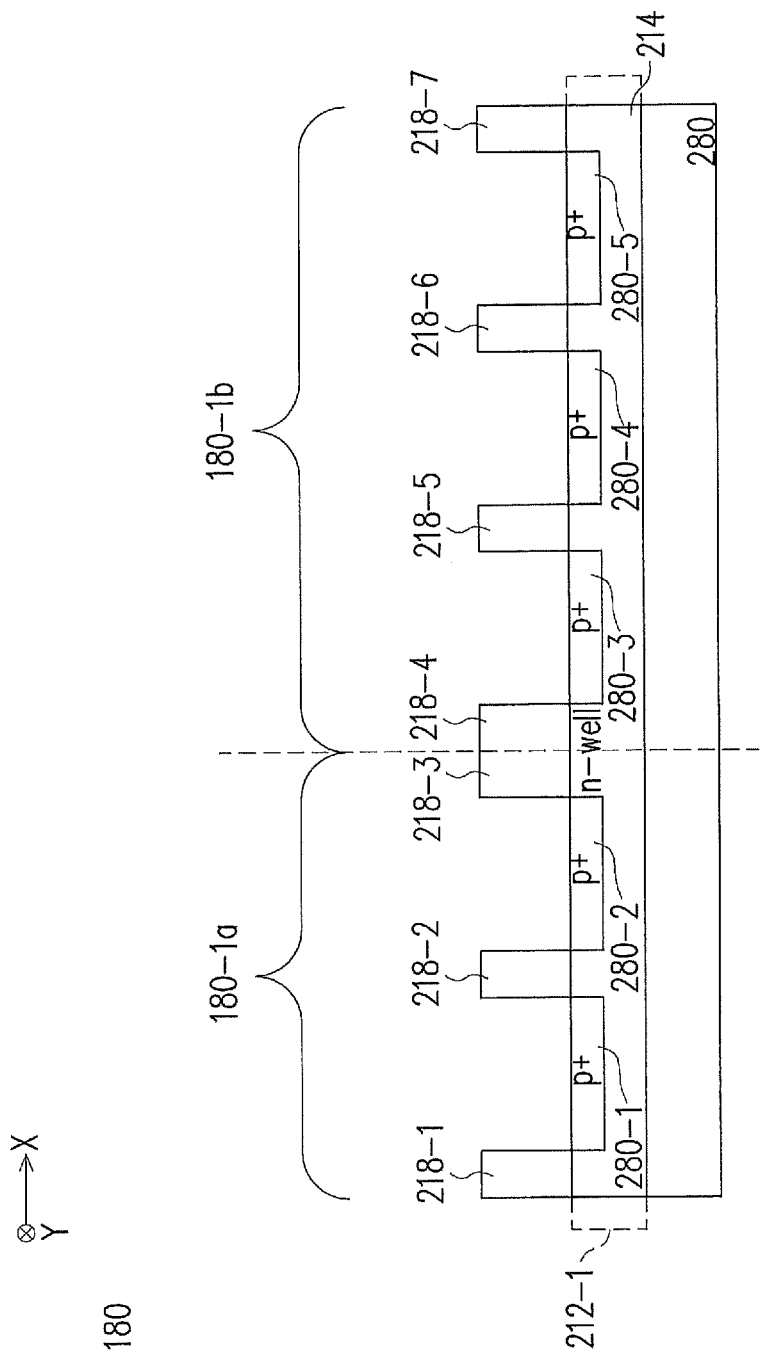
FIGS. 2C, 2D, 2E and 2F each illustrates a part of a corresponding cross-sectional view of some cells of the integrated circuit, in accordance with some embodiments of the present disclosure.
Figure 2D:
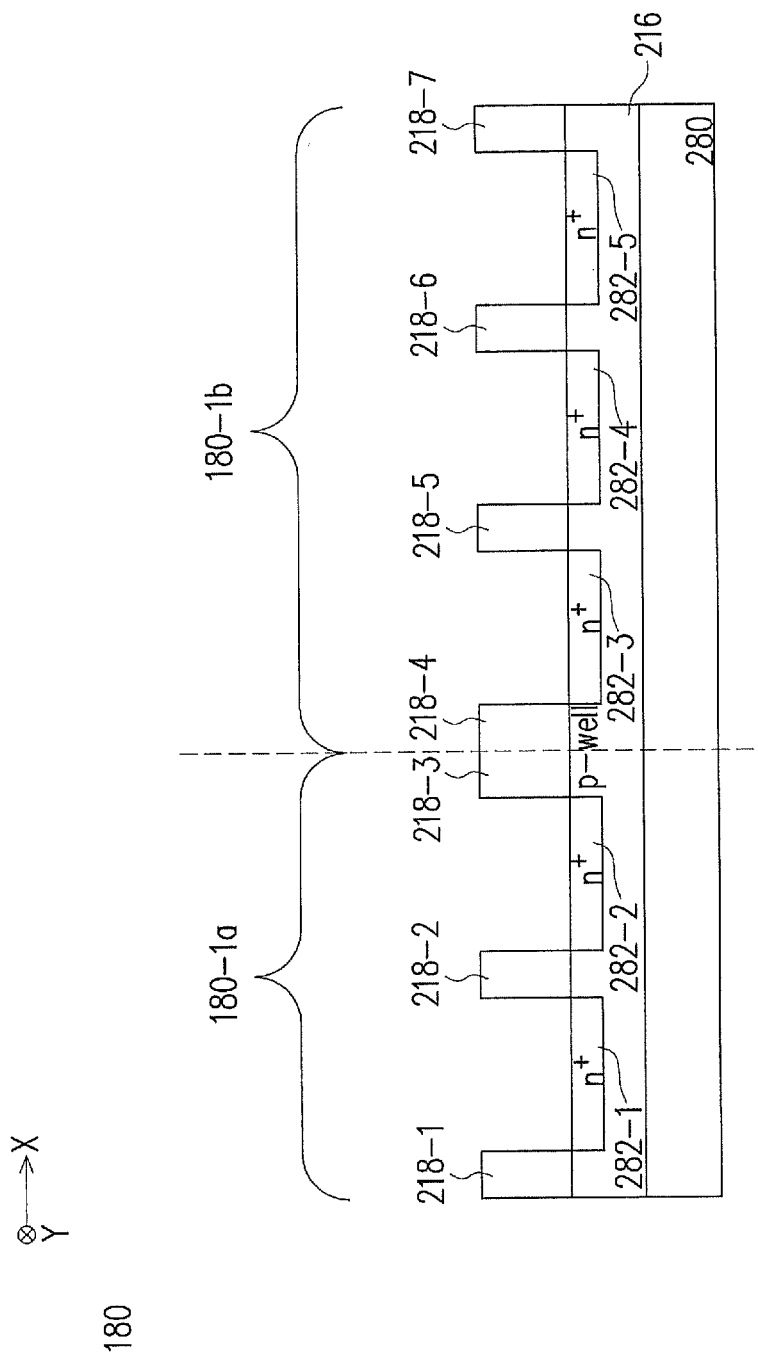

FIG. 2A illustrates a top view of a corresponding layout design of the integrated circuit 180 at one or more first layout levels, and FIG. 2B illustrates a top view of the corresponding layout design of the integrated circuit 180 at a second layout level above the one or more first layout levels, in accordance with some embodiments. In some other embodiments, the second layout level may be below or the same as the one or more first layout levels. For purposes of clarity, FIGS. 2C and 2D illustrate part of corresponding cross-sectional views of the cells 180-1*a* and 180-1*b* of the integrated circuit 180 taken along lines A-A and B-B, respectively.

As shown in FIG. 2A, along the row 1 of grid 181, the cells 180-1*a* and 180-1*b* respectively include four active regions 212-1, 212-2, 212-3, and 212-4 continuously extending along the X direction across the cells 180-1*a* to 180-1*b*; along the row 2 of grid 181, the cells 180-2*a*, 180-2*b*, 180-2*c*, and 180-2*d* respectively include two active regions 222-1 and 222-2 continuously extending along the X direction across the cells 180-2*a* to 180-2*d*; along the row 3 of grid 181, the cells 180-3*a*, 180-3*b*, and 180-3*c* respectively include four active regions 232-1, 232-2, 232-3, and 232-4 continuously extending along the X direction across the cells 180-3*a* to 180-3*c*; along the row 4 of gird 181, the cells 180-4*a*, 180-4*b*, and 180-4*c* respectively include two active regions 242-1 and 242-2 continuously extending along the X direction across the cells 180-4*a* to 180-4*c*; along the row 5 of grid 180, the cells 180-5*a*, 180-5*b*, 180-5*c*, and 180-5*d* respectively include four active regions 252-1, 252-2, 252-3, and 252-4 continuously extending along the X direction across the cells 180-5*a* to 180-5*d*; and along the row 6 of grid 181, the cells 180-6*a*, 180-6*b*, 180-6*c*, 180-6*d*, and 180-6*e* respectively include two active regions 262-1 and 262-2 continuously extending along the X direction across the cells 180-6*a* to 180-6*e*.

As mentioned above, the active regions of the cells of the integrated circuit 180 serve as source features or drain features of the respective transistors, and each cell of the integrated circuit 180 is configured to perform a specific logic function. Thus, it is understood that each cell of the integrated circuit 180 may include a first region implanted with n-type dopants, a second region implanted with p-type dopants, and a respective plurality of gate patterns. In some embodiments, one subset of the respective active regions are formed over the first region to form p-type MOSFETs, and the other subset of the respective active regions are formed over the second region to form n-type MOSFETs. Further, the respective plurality of gate patterns may run in a direction substantially orthogonal to the direction along which the active regions extend to form respective gates of the p-type and n-type MOSFETs, in accordance with some embodiments. As such, the cells of the integrated circuit 180 may present different gate pattern layouts to perform respective specific logic functions.

For example, referring still to FIG. 2A, the cell 180-1*a* includes a first region 214 implanted with n-type dopants and a second region 216 implanted with p-type dopants that are divided by a line 215, and gate patterns 218-1, 218-2, and 218-3 that are spaced apart from each other by respective distances and each runs in the Y direction. In some embodiments, the active regions 212-1 to 212-4 may be each disposed over either the first region 214 or the second region 216 and the gate patterns 218-1 to 218-3 may be each disposed over the respective active regions 212-1 to 212-4, which will be shown with reference to FIGS. 2C and 2D. Similarly, the adjacent cell 180-1b also includes the first region 214 and the second region 216 over which the active regions 212-1 to 212-4 are disposed, and gate patterns 218-4, 218-5, 218-6, and 218-7 that are spaced apart from each other by respective distances and each runs in the Y direction.

In some embodiments, the active regions of the cells of the integrated circuit 180 disposed along the other rows are also disposed over respective first and second implanted regions, and one or more respective gate patterns also run in the Y direction, such that the respective configurations of the cells of the integrated circuit 180 disposed along other rows are briefly described as follows.

Along row 2, the cells 180-2a to 180-2d include a first region 224 implanted with n-type dopants and a second region 226 implanted with p-type dopants that are divided by a line 225, wherein the active region 222-1 is disposed over the first region 224 and the active region 222-2 is disposed over the second region 226. The cell 180-2a further includes gate patterns 228-1, 228-2, and 228-3 that are spaced apart from each other by respective distances and each runs in the Y direction; the cell 180-2b further includes gate patterns 228-4 and 228-5 that are spaced apart from each other by a respective distance and each runs in the Y direction; the cell 180-2c further includes gate patterns 228-6, 228-7, 228-8, and 228-9 that are spaced apart from each other by respective distances and each runs in the Y direction; and the cell 180-2d further includes gate patterns 228-10, 228-11, and 228-12 that are spaced apart from each other by respective distances and each runs in the Y direction.

Along row 3, the cells 180-3a to 180-3c include a first region 234 implanted with n-type dopants and a second region 236 implanted with p-type dopants that are divided by a line 235, wherein the active region 232-1 and 232-2 are disposed over the first region 234 and the active region 232-3 and 232-4 are disposed over the second region 236. The cell 180-3a further includes gate patterns 238-1, 238-2, and 238-3 that are spaced apart from each other by respective distances and each runs in the Y direction; the cell 180-3b further includes gate patterns 238-4, 238-5, and 238-6 that are spaced apart from each other by respective distances and each runs in the Y direction; and the cell 180-3c further includes gate patterns 238-7, 238-8, and 238-9 that are spaced apart from each other by respective distances and each runs in the Y direction.

Along row 4, the cells 180-4a to 180-4c include a first region 244 implanted with n-type dopants and a second region 246 implanted with p-type dopants that are divided by a line 245, wherein the active region 242-1 is disposed over the first region 244 and the active region 242-2 is disposed over the second region 246. The cell 180-4a further includes gate patterns 248-1, 248-2, and 248-3 that are spaced apart from each other by respective distances and each runs in the Y direction; the cell 180-4b further includes gate patterns 248-4, 248-5, and 248-6 that are spaced apart from each other by respective distances and each runs in the Y direction; and the cell 180-4c further includes gate patterns 248-7, 248-8, 248-9, and 248-10 that are spaced apart from each other by respective distances and each runs in the Y direction.

Along row 5, the cells 180-5a to 180-5d include a first region 254 implanted with n-type dopants and a second region 256 implanted with p-type dopants that are divided by a line 255, wherein the active region 252-1 and 252-2 are disposed over the first region 254 and the active region 252-3 and 252-4 are disposed over the second region 256. The cell 180-5a further includes gate patterns 258-1, 258-2, and 258-3 that are spaced apart from each other by respective distances and each runs in the Y direction; the cell 180-5b further includes gate patterns 258-4 and 258-5 that are spaced apart from each other by a respective distance and each runs in the Y direction; the cell 180-5c further includes gate patterns 258-6, 258-7, and 258-8 that are spaced apart from each other by respective distances and each runs in the Y direction; and the cell 180-5d further includes gate patterns 258-9, 258-10, and 258-11 that are spaced apart from each other by respective distances and each runs in the Y direction.

Along row 6, the cells 180-6a to 180-6e include a first region 264 implanted with n-type dopants and a second region 266 implanted with p-type dopants that are divided by a line 265, wherein the active region 262-1 is disposed over the first region 264 and the active region 262-2 is disposed over the second region 266. The cell 180-6a further includes gate patterns 268-1 and 268-2 that are spaced apart from each other by a respective distance and each runs in the Y direction; the cell 180-6b further includes gate patterns 268-3 and 268-4 that are spaced apart from each other by a respective distance and each runs in the Y direction; the cell 180-6c further includes gate patterns 268-5 and 268-6 that are spaced apart from each other by a respective distance and each runs in the Y direction; the cell 180-6d further includes gate patterns 268-7 and 268-8 that are spaced apart from each other by respective distances and each runs in the Y direction; and the cell 180-6e further includes gate patterns 268-9 and 268-10 that are spaced apart from each other and each runs in the Y direction.

In some embodiments, the first and second implanted regions, active regions, and gate patterns of each cell of the integrated circuit 180 may be formed over a substrate on one or more first layout levels, which will be shown in the cross-sectional view of FIGS. 2C and 2D. As mentioned above, FIG. 2B illustrates the top view of the layout design of the integrated circuit 180 at the second layout level above the one or more first layout levels.

According to some embodiments of the present disclosure, at the second layout level, each cell includes a plurality of conductor patterns running in the Y direction (i.e., in parallel with the active regions) and over the respective gate patterns. In some embodiments, such a second layout level, including the plurality of conductor patterns, is directly disposed above the one or more first layout levels that include the gate patterns (i.e., no intermediate layout level disposed therebetween), which is herein referred to as an "M1 level (the first metal level/layer)." Further, the plurality of conductor patterns in the M1 level are each electrically coupled to one or more of the above-discussed p-type and n-type MOSFETs through at least a via structure (not shown) thereby allowing each of the p-type and n-type MOSFETs to be powered, or electrically connect to other MOSFETs or devices.

As shown in FIG. 2B, the M1 level includes a plurality of conductor patterns running in the Y direction such as, for example, power rails 270-1, 270-2, 270-3, 270-4, 270-5, 270-6, and 270-7, and M1 interconnection lines 272-1, 272-2, 272-3, 272-4, 272-5, 272-6, 272-7, 272-8, 272-9, 272-10, 272-11, 272-12, 272-13, 272-14, 272-15, 272-16, and 272-17. In some embodiments, when viewing from the top of the M1 level, the cells along each row are disposed between two adjacent power rails that are each configured to carry power signals (e.g., VDD, ground, etc.). Further, between such two adjacent power rails, a respective subset of the M1 interconnection lines, in parallel with one another, run over the cells.

For example, the cells of the cell group 180-1 at row 1 are disposed between the power rails 270-1 and 270-2 with the M1 interconnection lines 272-1 to 272-4 running thereupon; the cells of the cell group 180-2 at row 2 are disposed between the power rails 270-2 and 270-3 with the M1 interconnection lines 272-5 to 272-6 running thereupon; the cells of the cell group 180-3 at row 3 are disposed between the power rails 270-3 and 270-4 with the M1 interconnection lines 272-7 to 272-10 running thereupon; the cells of the cell group 180-4 at row 4 are disposed between the power rails 270-4 and 270-5 with the M1 interconnection lines 272-11 to 272-12 running thereupon; the cells of the cell group 180-5 at row 5 are disposed between the power rails 270-5 and 270-6 with the M1 interconnection lines 272-13 to 272-16 running thereupon; and the cells of the cell group 180-6 at row 6 are disposed between the power rails 270-6 and 270-7 with the M1 interconnection lines 272-17 to 272-18 running thereupon.

In some embodiments, the number of M1 interconnection lines running over a cell may correspond to the number of active regions included in the cell. More specifically, for a row with a greater row height (i.e., the cells therein each having a higher number of active regions), more M1 interconnection lines may be included, while for a row with a shorter row height (i.e., the cells therein each having a lower number of active regions), less M1 interconnection lines may be included. For example, the number of M1 interconnection lines running over cells disposed at row 1, which have 4 active regions (e.g., 212-1 to 212-4), may be more than the number of M1 interconnection lines running over cells disposed at row 2, which have 2 active regions (e.g., 222-1 and 222-2). In the illustrated embodiment of FIG. 2B, the number of M1 interconnection lines disposed at row 1 is 4 (equal to the number of active regions of the cells at row 1) and the number of M1 interconnection lines disposed at row 2 is 2 (equal to the number of active regions of the cells at row 2). However, it is understood that the number of M1 interconnection lines is not limited to be equal to the number of active regions run over by the M1 interconnection lines.

Further, in some embodiments, each of the M1 interconnection lines 272-1 to 272-17 may share a substantially conformal width 273 along the X direction, and may be separated apart from adjacent M1 interconnection line(s) or power rail(s) by a substantially similar distance 275. Such a design constraint on the formation of M1 interconnection lines may advantageously ease the design complexity. For example, the M1 interconnection line 272-2 has the conformal width 273 along the X direction, and is separated apart from the M1 interconnection lines 272-1 and 272-3 by the distance 275, respectively.

Referring to FIGS. 2C and 2D, the cross-sectional views of the cells 180-1a and 180-1b at the first one or more layout levels and taken along the lines A-A and B-B, respectively, are shown, in accordance with some embodiments. As respectively shown in FIGS. 2C and 2D, the first region 214 implanted with n-type dopants, herein referred to as "n-well 214," is disposed over a substrate 280; and the second region 216 implanted with p-type dopants, herein referred to as "p-well 216," is disposed over the substrate 280. In some embodiments, the substrate 280 includes Si, Ge, SiGe, InAs, InGaAs, InAlAs, InP, or the like; the n-well 214 includes Si, Ge, SiGe, InAs, InGaAs, InAlAs, InP, or the like; and the p-well 216 includes Si, Ge, SiGe, InAs, InGaAs, InAlAs, InP, or the like. In some embodiments, when the substrate 280 includes Si, the n-well 214 may also include Si but doped with n-type dopants, e.g., P, As, or the like, and the p-well 246 may also include Si but doped with p-type dopants, e.g., B, Ga, or the like.

In some embodiments, the n-well 214 may further includes a first set of regions 280-1, 280-2, 280-3, 280-4, and 280-5 implanted with p-type dopants in an elevated doping concentration; and the p-well 216 may further includes a second set of regions 282-1, 282-2, 282-3, 282-4, and 282-5 implanted with n-type dopants in an elevated doping concentration. Such first and second sets of implanted regions 280-1 to 280-5 and 282-1 to 282-5, each of which is disposed between two adjacent gate patterns in the X direction, may serve as sources or drains of the respective MOSFETs. For example, in FIG. 2C, the region 280-1, disposed between the gate patterns 218-1 and 218-2, may serve as either a source or drain of a p-type MOSFET that has the gate pattern 218-1 or 218-2 as its gate; and in FIG. 2D, the region 282-2, disposed between the gate patterns 218-2 and 218-3, may serve as either a source or drain of an n-type MOSFET that has the gate pattern 218-2 or 218-3 as its gate.

Figure 2E:
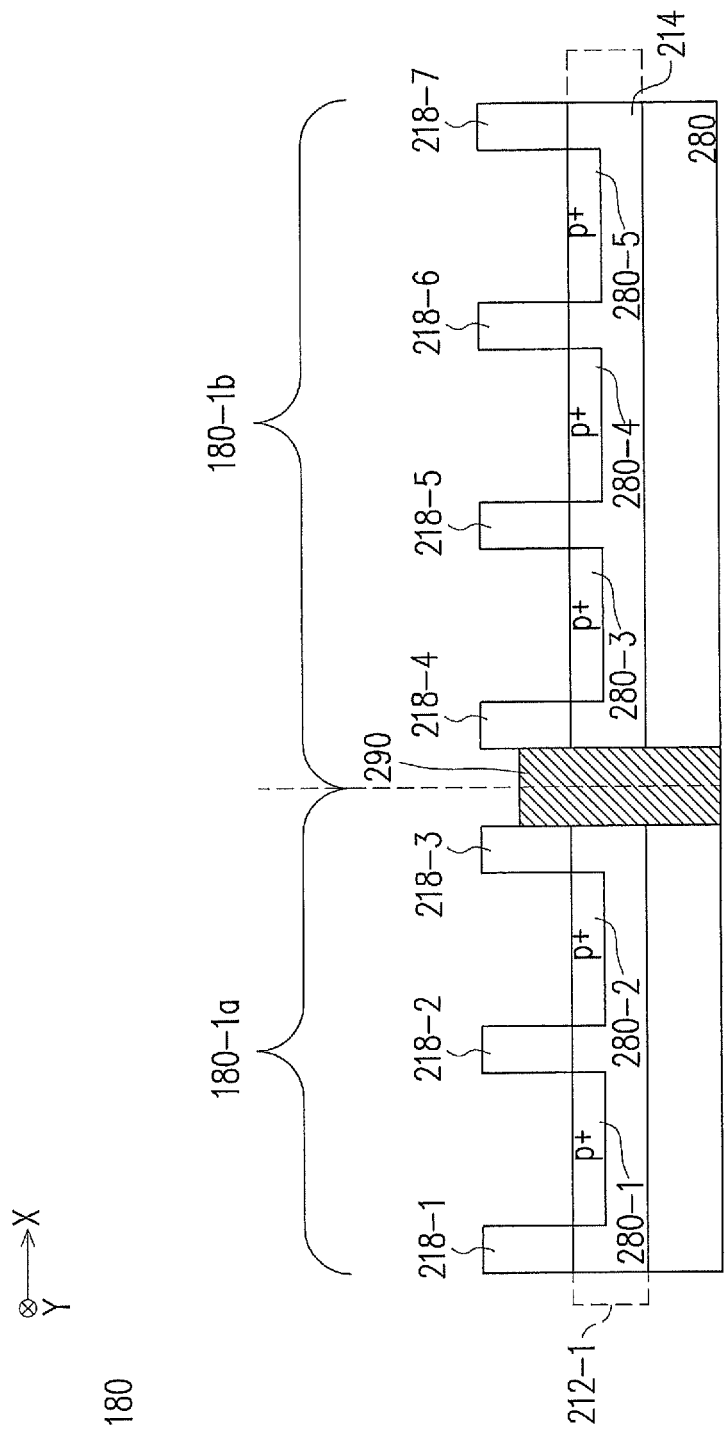
Figure 2F:
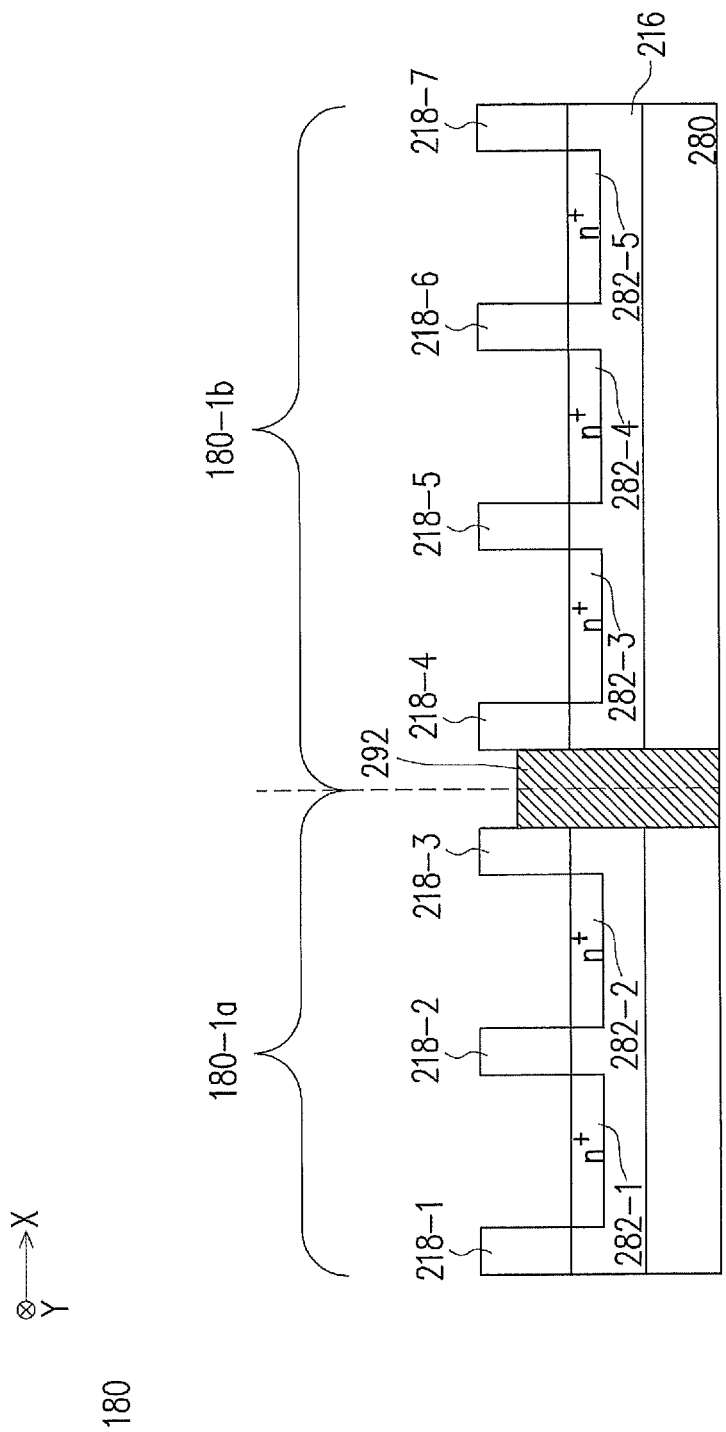

In the illustrated embodiments of FIGS. 2C and 2D, although the respective "side" gate patterns 218-3 and 218-4 of the adjacent cells 180-1a and 180-1b are merged together to form a single gate pattern, such side gate patterns may be separated from each other by a source/drain while remaining within the scope of the present disclosure. In other embodiments as shown in FIGS. 2E and 2F, the adjacent cells 180-1a and 180-1b do not share a side gate pattern, but have a cell boundary in the middle of a shallow trench isolation (STI) 290, 292 between the side gate patterns 218-3 and 218-4.

According to some embodiments, the n-well 214, which includes the first set of implanted regions 280-1 to 280-5, may form a portion of the continuously extending active region 212-1, as shown in FIG. 2C; and the p-well 216, which includes the second set of implanted regions 282-1 to 282-5, may form a portion of the continuously extending active region 212-3, as shown in FIG. 2D.

Figure 2G:
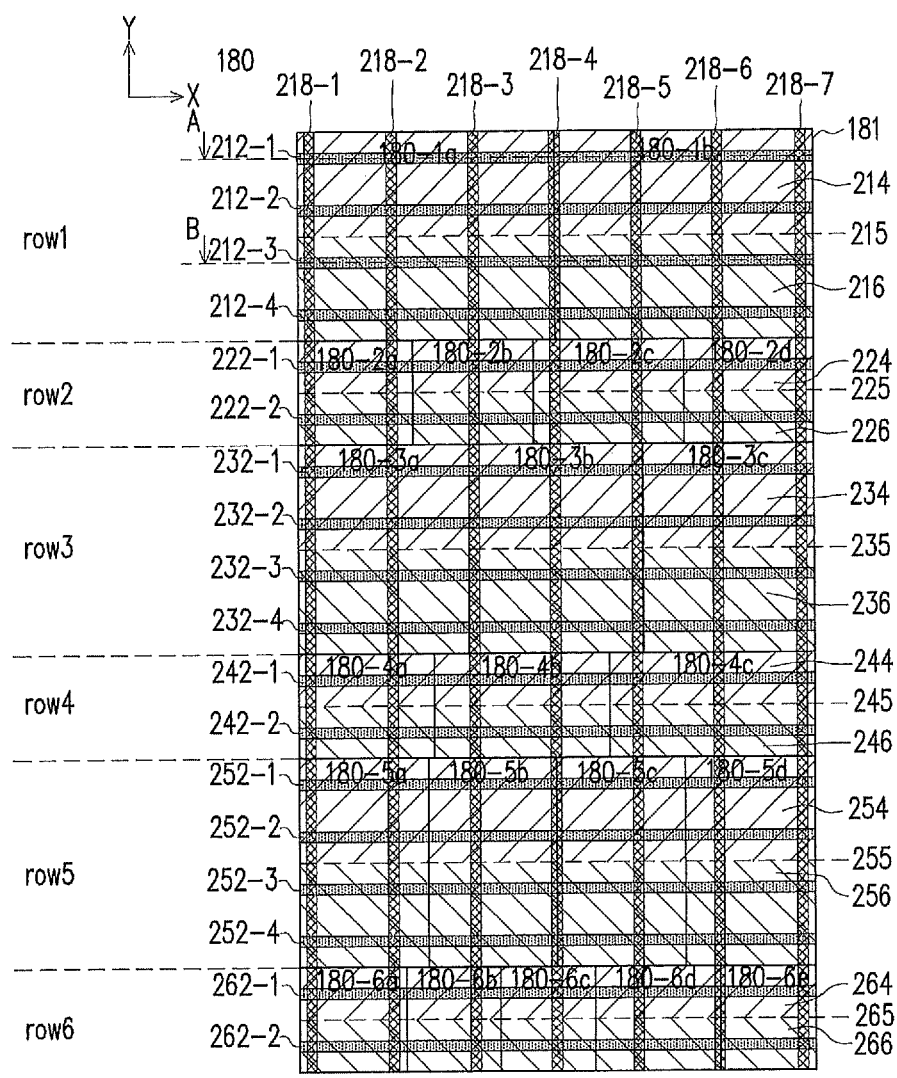
FIG. 2G illustrates a top view of another corresponding layout design of the exemplary integrated circuit at one or more first layout levels, in accordance with some embodiments of the present disclosure.

FIG. 2G illustrates a top view of another corresponding layout design of the exemplary integrated circuit 180 at one or more first layout levels, in accordance with some embodiments of the present disclosure. In this embodiment, as shown in FIG. 2G, each of the gate patterns 218-1 to 218-7 finals a straight line through different rows of the integrated circuit 180. That is, in each of the gate patterns 218-1 to 218-7, poly gates in different rows align with each other along a same line in the Y direction. But the poly gates in different rows may be separated or isolated at the boundary between two adjacent rows. That is, each line of the gate patterns 218-1 to 218-7 may have a break at the boundary between two adjacent rows.

Figure 3:
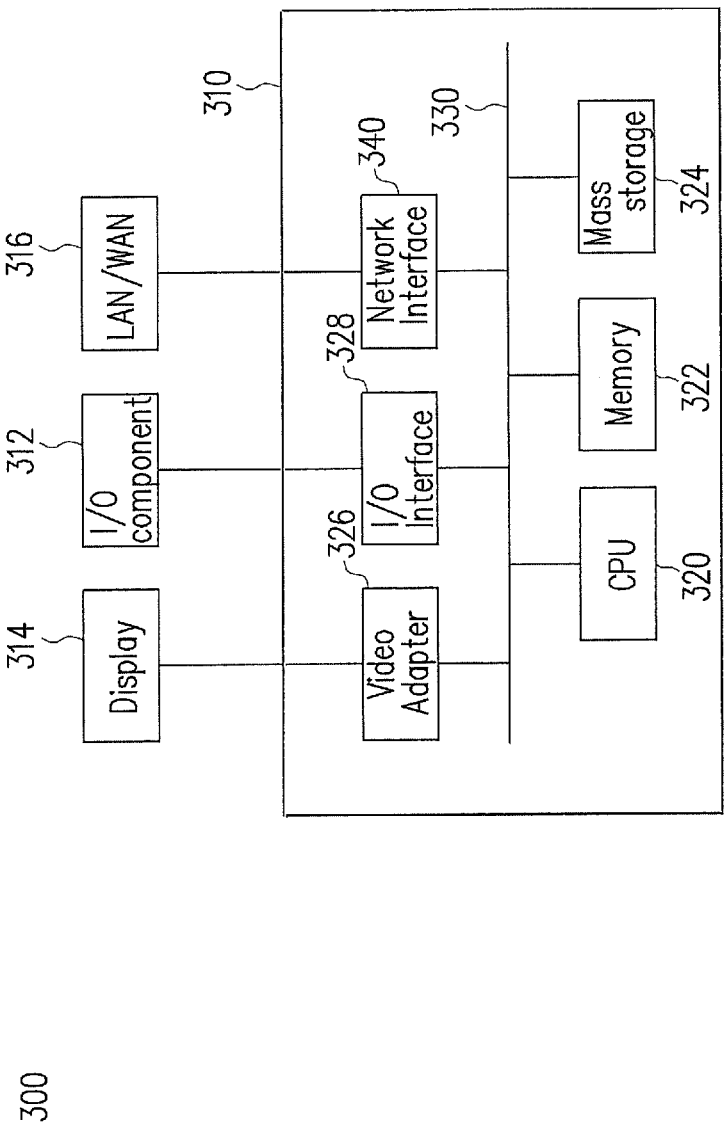
FIG. 3 illustrates a block diagram of an exemplary information handling system (IHS), in accordance with some embodiments of the present disclosure.

Referring now to FIG. 3, a block diagram of an information handling system (IHS) 300 is provided, in accordance with some embodiments of the present invention. The IHS 300 may be a computer platform used to implement any or all of the processes discussed herein to design an integrated circuit with mixed row heights (e.g., the integrated circuits 100, 140, and 180). The IHS 300 may comprise a processing unit 310, such as a desktop computer, a workstation, a laptop computer, or a dedicated unit customized for a particular application. The HIS 300 may be equipped with a display 314 and one or more input/output (I/O) components 312, such as a mouse, a keyboard, or printer. The processing unit 310 may include a central processing unit (CPU) 320, memory 322, a mass storage device 324, a video adapter 326, and an I/O interface 328 connected to a bus 330.

The bus 330 may be one or more of any type of several bus architectures including a memory bus or memory controller, a peripheral bus, or video bus. The CPU 320 may comprise any type of electronic data processor, and the memory 322 may comprise any type of system memory, such as static random access memory (SRAM), dynamic random access memory (DRAM), or read-only memory (ROM).

The mass storage device 324 may comprise any type of storage device configured to store data, programs, and other information and to make the data, programs, and other information accessible via the bus 330. The mass storage device 324 may comprise, for example, one or more of a hard disk drive, a magnetic disk drive, an optical disk drive, or the like.

The video adapter 326 and the I/O interface 328 provide interfaces to couple external input and output devices to the processing unit 310. As illustrated in FIG. 3, examples of input and output devices include the display 314 coupled to the video adapter 326 and the I/O components 312, such as a mouse, keyboard, printer, and the like, coupled to the I/O interface 328. Other devices may be coupled to the processing unit 310, and additional or fewer interface cards may be utilized. For example, a serial interface card (not shown) may be used to provide a serial interface for a printer. The processing unit 310 also may include a network interface 340 that may be a wired link to a local area network (LAN) or a wide area network (WAN) 316 and/or a wireless link.

It should be noted that the IHS 300 may include other components/devices. For example, the IHS 300 may include power supplies, cables, a motherboard, removable storage media, cases, and the like. These other components/devices, although not shown, are considered part of the IHS 300.

In some embodiments of the present invention, an Electronic Design Automation (EDA) is program code that is executed by the CPU 320 to analyze a user file to obtain the layout of an integrated circuit (e.g., the integrated circuits 100, 140, and 180 discussed above). Further, during the execution of the EDA, the EDA may analyze functional components of the layout, as is known in the art. The program code may be accessed by the CPU 320 via the bus 330 from the memory 322, mass storage device 324, or the like, or remotely through the network interface 340.

Figure 4:
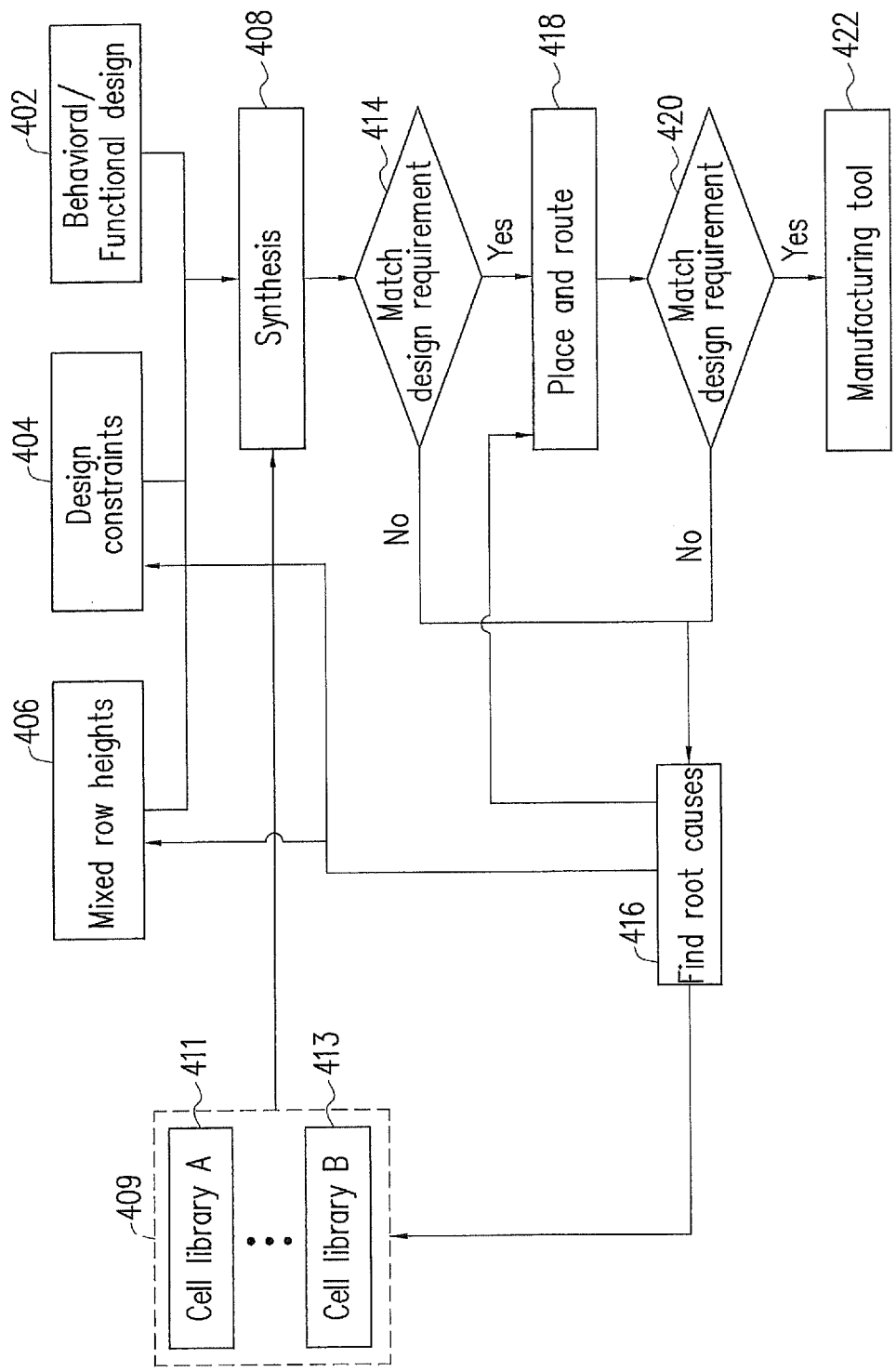
FIG. 4 illustrates a flow chart of an exemplary method performed by the IHS to generate a physical layout of an integrated circuit that includes mixed row heights, in accordance with some embodiments of the present disclosure.

FIG. 4 illustrates a flow chart of an exemplary method 400 performed by the IHS 300 to generate a physical layout of an integrated circuit that includes mixed row heights, in accordance with some embodiments of the present disclosure. In some embodiments, such a method 400 may be collectively referred to as an EDA. In various embodiments, the operations of the method 400 are performed by the respective components illustrated in FIG. 3. For purposes of discussion, the following embodiment of the method 400 will be described in conjunction with FIG. 3. The illustrated embodiment of the method 400 is merely an example. Therefore, it should be understood that any of a variety of operations may be omitted, re-sequenced, and/or added while remaining within the scope of the present disclosure.

The method 400 starts with provision operations of "behavioral/functional design 402," "design constraints 404," and "mixed row heights 406." In some embodiments, the behavioral/functional design 402 specifies the desired behavior or function of an integrated circuit (e.g., the integrated circuits 100, 140, and/or 180 discussed above) based upon various signals or stimuli applied to the inputs of an overall design of the integrated circuit, and may be written in a suitable language, such as a hardware description language (HDL). The behavioral/functional design 402 may be uploaded into the processing unit 310 through the I/O interface 328 (FIG. 3), such as by a user creating the file while the EDA is executing. Alternatively, the behavioral/functional design 402 may be uploaded and/or saved on the memory 322 or mass storage device 324, or the behavioral/functional design 402 may be uploaded through the network interface 340 from a remote user (FIG. 3). In these instances, the CPU 320 will access the behavioral/functional design 402 during execution of the EDA.

Further, the user also provides the design constraints 404 in order to constrain the overall design of a physical layout of the behavioral/functional design 402. In some embodiments, the design constraints 404 may be input, for example, through the I/O interface 328, downloading through the network interface 340, or the like. The design constraints 404 may specify timing, process parameters, and other suitable constraints with which the behavioral/functional design 402, once physically formed into an integrated circuit, must comply.

Still further, the user may also provide the mixed row heights 406 in order to allow the physical layout of the behavioral/functional design 402 to be arranged in a plurality of rows, which have at least two respective different row heights. In some embodiments, the mixed row heights 406 may be input, for example, through the I/O interface 328, downloading through the network interface 340, or the like. The mixed row heights 404 may specify a row ratio (i.e., a ratio of the numbers of rows having respective different row heights as described above), respective locations of the rows having respective different row heights with respect to a grid of the physical layout, and/or other suitable constraints with which the behavioral/functional design 402, once physically formed into an integrated circuit, must comply.

After the behavioral/functional design 402, the design constraints 404, and the mixed row heights 406 are provided, the method 400 continues to operation "synthesis 408" to create a functionally equivalent logic gate-level circuit description, such as a netlist. The synthesis 408 forms the functionally equivalent logic gate-level circuit description by matching the behavior and/or functions desired from the behavioral/functional design 402 to (standard) cells from a set of cell libraries 409, while simultaneously meeting the constraints specified by the design constraints 404 and mixed row heights 406.

In some embodiments, the set of cell libraries 409 may include a plurality of cell libraries that have respective different cell heights such as, for example, cell library 411, cell library 413, etc. In some embodiments, the cell libraries 411 and 413 may correspond to the above-described cell library A and cell library B, respectively. Each of the plurality of cell libraries contains a listing of pre-designed cells, each of which is with a common cell height and may perform a specific logic function on a small scale. For example, the cells of the cell library A 411 may share the cell height A, and the cells of the cell library A 411 may share the cell height B. The cell is stored in the cell libraries (e.g., the cell library A 411, the cell library B 413, etc.) as information comprising internal circuit elements, the various connections to these circuit elements, a pre-designed physical layout pattern that includes the cell height, dopant types, doping concentrations, wells, and the like. Additionally, the stored cell may also comprise a shape of the cell, terminal positions for external connections, delay characteristics, power consumption, and the like.

Once the synthesis 408 generates the functionally equivalent logic gate-level circuit description from the behavioral/functional design 402, the design constraints 404, and the mixed row heights 408 by using the cells of the set of cell libraries 409 (e.g., the cell library A 411, the cell library B 413, etc.), the method 400 continues to a first determination operation 414 to check whether design requirements are matched. In some embodiments, in the first determination operation 414, various requirements may be checked such as, for example, a ratio of available cells in the cell library A 411 to available cells in the cell library B 413, a timing quality of the functionally equivalent logic gate-level circuit description, a power quality of the functionally equivalent logic gate-level circuit description, etc., by performing one or more simulations using circuit simulators, e.g. Simulation Program with Integrated Circuit Emphasis (SPICE). If all the design requirements in the first determination operation 414 are met, the method 400 continues to operation "place and route 418," which will be discussed in further detail below. On the other hand, if not all of the design requirements in the first determination operation 414 are met, the method 400 continues to operation "find root causes 416," which will also be discussed in further detail below.

The place and route 418 is performed to generate an actual physical design for the overall structure. The place and route 418 forms the physical design by taking the chosen cells from the set of cell libraries 409 and placing them into respective rows. In some embodiments, a first set of such rows have a first row height substantially similar to the height of a majority of the cells disposed within the first set of rows such that the power rails, implants and wells may be aligned between the cells; and a second set of such rows have a second row height, different from the first row height, substantially similar to the height of a majority of the cells disposed within the second set of rows such that the power rails, implants and wells may be aligned between the cells. The placement of each cell within the cell rows, and the placement of each cell row in relation to other cell rows, may be guided by cost functions in order to minimize wiring lengths and area requirements of the resulting integrated circuit. This placement may be done either automatically by the place and route 418, or else may alternatively be performed partly through a manual process, whereby a user may manually insert one or more cells into a row.

Once the placement and route 418 finishes generating the actual physical design for the overall structure, the method 400 continues to a second determination operation 420 to check whether design requirements are matched. In some embodiments, in the second determination operation 420, various requirements may be checked such as, for example, a ratio of available cells in the cell library A 411 to available cells in the cell library B 413 after the placement and route 418, a timing quality of the actual physical design for the overall structure, a power quality of the actual physical design for the overall structure, whether a local congestion issue exists, etc., by performing one or more simulations using circuit simulators, e.g. Simulation Program with Integrated Circuit Emphasis (SPICE). If all the design requirements in the second determination operation 420 are met, the method 400 continues to operation "manufacturing tool 422," which will be discussed in further detail below. On the other hand, if not all of the design requirements in the second determination operation 420 are met, the method 400 continues to the find root causes 416, which will be discussed as follows.

According to some embodiments, the find root causes 416 is performed to find the causes resulting in the failure of meeting the design requirements in either the first determination operation 414 or the second determination operation 420. Various causes may result in the failure. Based on which of the causes is or are, the method 400 may proceed to a respective operation to re-perform that operation. For example, when the cause is due to poor power, performance, area (PPA) characteristics of the cells used to generate the functionally equivalent logic gate-level circuit description and/or a lack of available cells in the set of cell libraries 409, the method 400 may proceed to an operation to re-assess the qualities/quantities of the cells of the set of cell libraries 409; when the cause is due to an incorrect arrangement of row(s), the method 400 may proceed back to the mixed row heights 406 to re-assess the constraints specified therein; when the cause is due to an infeasibility of synthesizing the functionally equivalent logic gate-level circuit description, the method 400 may proceed back to the design constraints 404 to re-assess the constraints specified therein; and when cause is due to an infeasibility of generating the actual physical design, the method 400 may proceed back to the place and route 418 to re-place and/or re-route.

Referring again to the second determination operation 420, once a physical design has been successfully generated by the place and route 418 while meeting all the design requirements, the method 400 continues to operation "manufacturing tool 422" to generate, e.g., photolithographic masks, that may be used in physically manufacturing the physical design. The physical design may be sent to the manufacturing tool 422 through that LAN/WAN 316.

Figure 5:
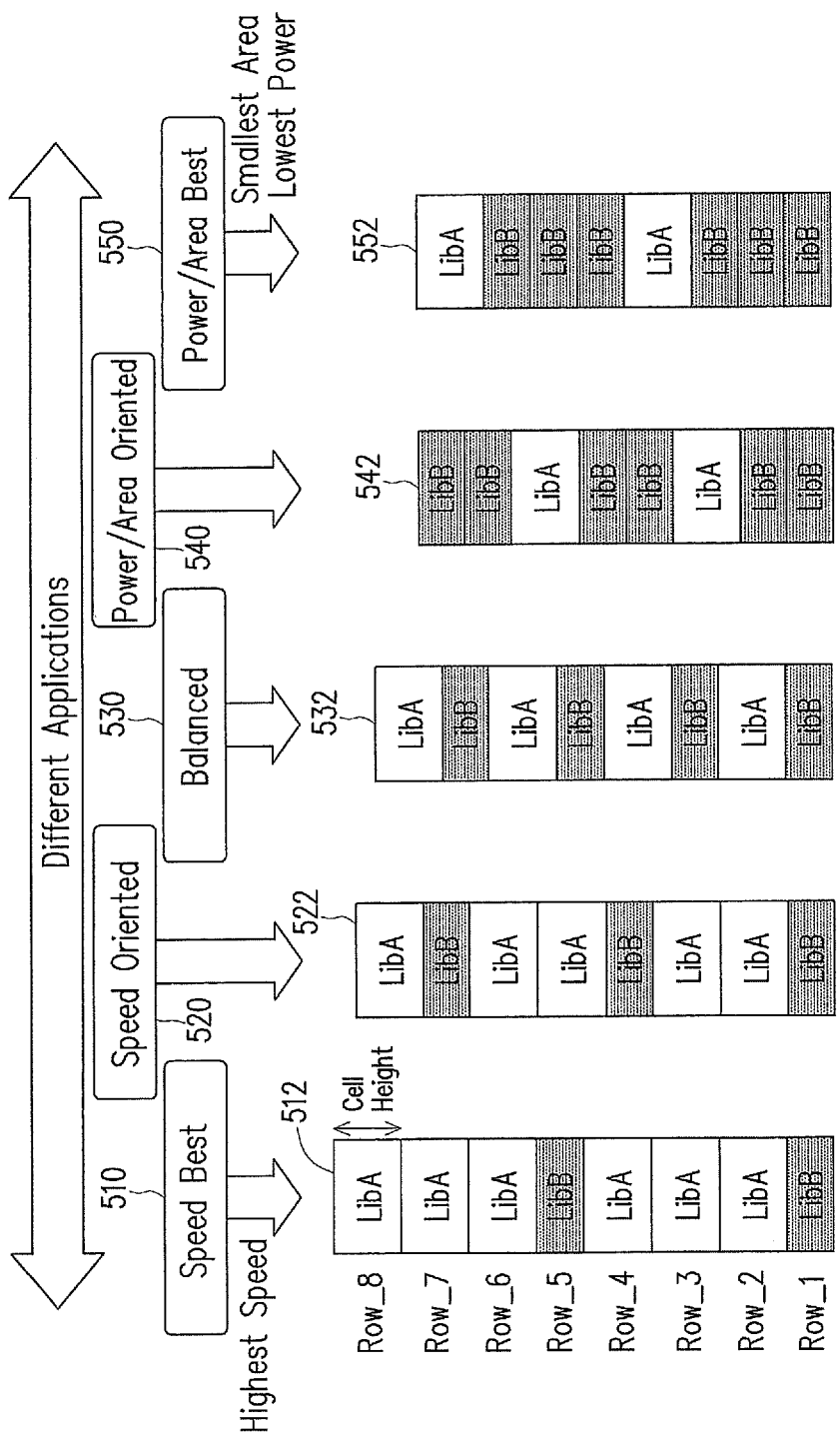
FIG. 5 illustrates different applications for various mixed row design scenarios, in accordance with some embodiments of the present disclosure.

FIG. 5 illustrates different applications for various mixed row design scenarios, in accordance with some embodiments of the present disclosure. FIG. 5 shows five exemplary IC applications each of which corresponds to a different type of mixed row design. The mixed row designs 512, 522, 532, 542, 552, have different mixed row ratios between Row-A and Row-B, wherein Row-A represents a quantity of rows that include cells from cell library A, and Row-B represents a quantity of rows that include cells from cell library B. In this example, the cell height of each cell from cell library A is larger than the cell height of each cell from cell library B.

For example, a "speed best" circuit 510 desired for a highest speed can be achieved by the mixed row design 512 that has a mixed row ratio of 3:1, which means the ratio between Row-A (a quantity of rows that include cells from cell library A) and Row-B (a quantity of rows that include cells from cell library B) is 3:1 in the mixed row design 512. This is because more cells with larger cell heights can help improving the speed.

In another example, a "power/area best" circuit 550 desired for a smallest area and lowest power consumption can be achieved by the mixed row design 552 that has a mixed row ratio of 1:3, which means the ratio between Row-A (a quantity of rows that include cells from cell library A) and Row-B (a quantity of rows that include cells from cell library B) is 1:3 in the mixed row design 552. This is because more cells with smaller cell heights can help saving the circuit area and decreasing the power consumption.

In another example, a "balanced" circuit 530 can be achieved by the mixed row design 532 that has a mixed row ratio of 1:1, which means the ratio between Row-A (a quantity of rows that include cells from cell library A) and Row-B (a quantity of rows that include cells from cell library B) is 1:1 in the mixed row design 532. The "balanced" circuit 530 will keep a balance between speed performance, which is not too high or too low, and area/power performance, where the area is not too big or too small and the power consumption is not too high to too low.

In yet another example, a "speed oriented" circuit 520 desired for a high but not highest speed can be achieved by the mixed row design 522 that has a mixed row ratio of 2:1, which means the ratio between Row-A (a quantity of rows that include cells from cell library A) and Row-B (a quantity of rows that include cells from cell library B) is 2:1 in the mixed row design 522.

In still another example, a "power/area oriented" circuit 540 desired for a high but not highest power/area performance can be achieved by the mixed row design 542 that has a mixed row ratio of 1:2, which means the ratio between Row-A (a quantity of rows that include cells from cell library A) and Row-B (a quantity of rows that include cells from cell library B) is 1:2 in the mixed row design 542.

Figure 6:
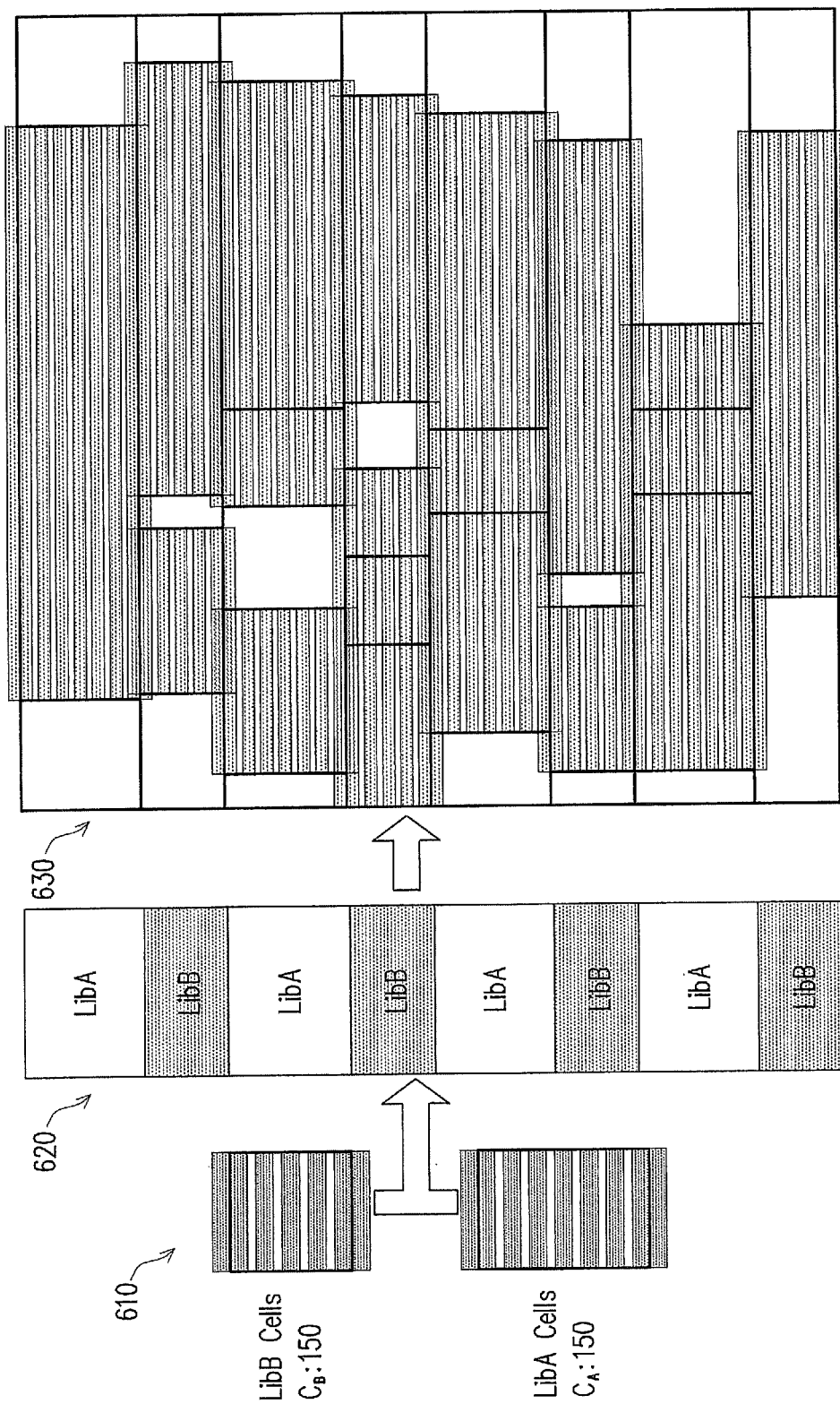
FIG. 6 illustrates an exemplary procedure for designing an integrated circuit that includes mixed row heights, in accordance with some embodiments of the present disclosure.

FIG. 6 illustrates an exemplary procedure for designing an integrated circuit that includes mixed row heights, in accordance with some embodiments of the present disclosure. At operation 610, at least two sets of libraries: Library A and Library B, are designed. The cells in different libraries have different cell heights and/or different number of metal lines. For example, a Library A cell has a higher cell height and five metal lines while a Library B cell has a lower cell height and three metal lines. At operation 620, a balanced design scenario is chosen to keep a mixed row ratio of 1:1 between the cells of the two libraries. At operation 630, a mixed row floorplan is initialized with a specified placement constraint for Library A and Library B based on the balanced mixed row ratio of 1:1.

Figure 7:
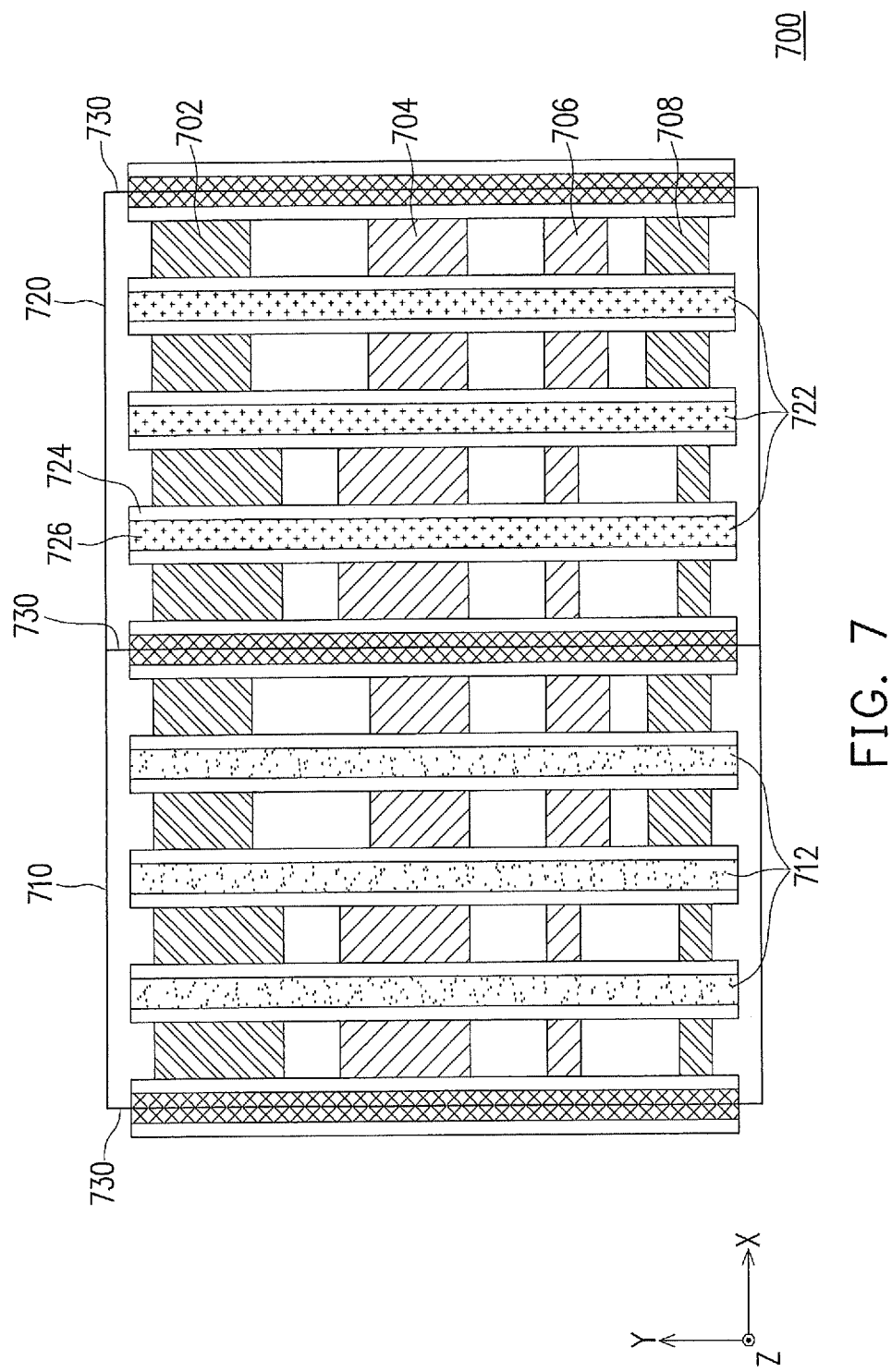
FIG. 7 illustrates a top view of a corresponding layout design of cells in a planar or nano-sheet at one or more layout levels, in accordance with some embodiments of the present disclosure.

FIG. 7 illustrates a top view of a corresponding layout design 700 of cells in a planar or nano-sheet at one or more layout levels, in accordance with some embodiments of the present disclosure. As shown in FIG. 7, the layout design 700 includes two adjacent cells 710, 720 arranged in a same row. Along this row, the cells 710 and 720 respectively include four active regions 702, 704, 706, 708 continuously extending along the X direction across the cells 710 and 720. The layout design 700 may be for a planar including the cells 710, 720, or for a nano-sheet including the cells 710, 720 and additional layers arranged along the Z direction.

In one embodiment, the active regions of the cell 720 serve as source features or drain features of respective transistors for the cell 720 to perform a specific logic function. Each of the four active regions 702, 704, 706, 708 may comprise a semiconductor material, e.g. silicon, and may include n-type or p-type dopants. In one example, the active regions 702, 708 are implanted with n-type dopants; and the active regions 704, 706 are implanted with p-type dopants.

Further, the cell 720 includes a plurality of gate patterns 722 extending in a direction (the Y direction) substantially orthogonal to the direction (the X direction) along which the active regions extend to form respective gates of the p-type and n-type MOSFETs, in accordance with some embodiments. In one embodiment, each gate pattern may include a dielectric layer 724 extending along the Y direction on the active regions 702, 704, 706, 708, and a metal layer 726 extending along the Y direction on the dielectric layer 724.

In one embodiment, the active regions of the cell 710 do not perform any specific function except for the cell 710 to fill into the circuit positions. In the example shown in FIG. 7, the cell 720 may be referred to as a functional cell, and the cell 710 may be referred to as a filler cell. The cell 710 and the cell 720 have similar structures. After the functional cells are placed into a circuit design layout, the filler cells are placed into circuit positions where no functional cell is placed. In this example, the cell 710 includes a plurality of dummy gate patterns 712 extending in the Y direction. As shown in FIG. 7, the cells 710, 720 also have edge gates 730 disposed on the boundaries between adjacent cells. The dummy gates 712 and the edge gates 730 may have same structure and materials as the functional gates 722. For example, each of the dummy gates 712 and the edge gates 730 may include a dielectric layer 724 extending along the Y direction on the active regions 702, 704, 706, 708, and a metal layer 726 extending along the Y direction on the dielectric layer 724.

In one embodiment, at least one of the active regions 702, 704, 706, 708 has a width varying along the X direction. As shown in FIG. 7, each of the active regions 702, 704, 706, 708 has a width that varies along the X direction. For example, the width of the active region 702 changes within each cell, and changes across two adjacent cells 710, 720, along the X direction.

Figure 8:
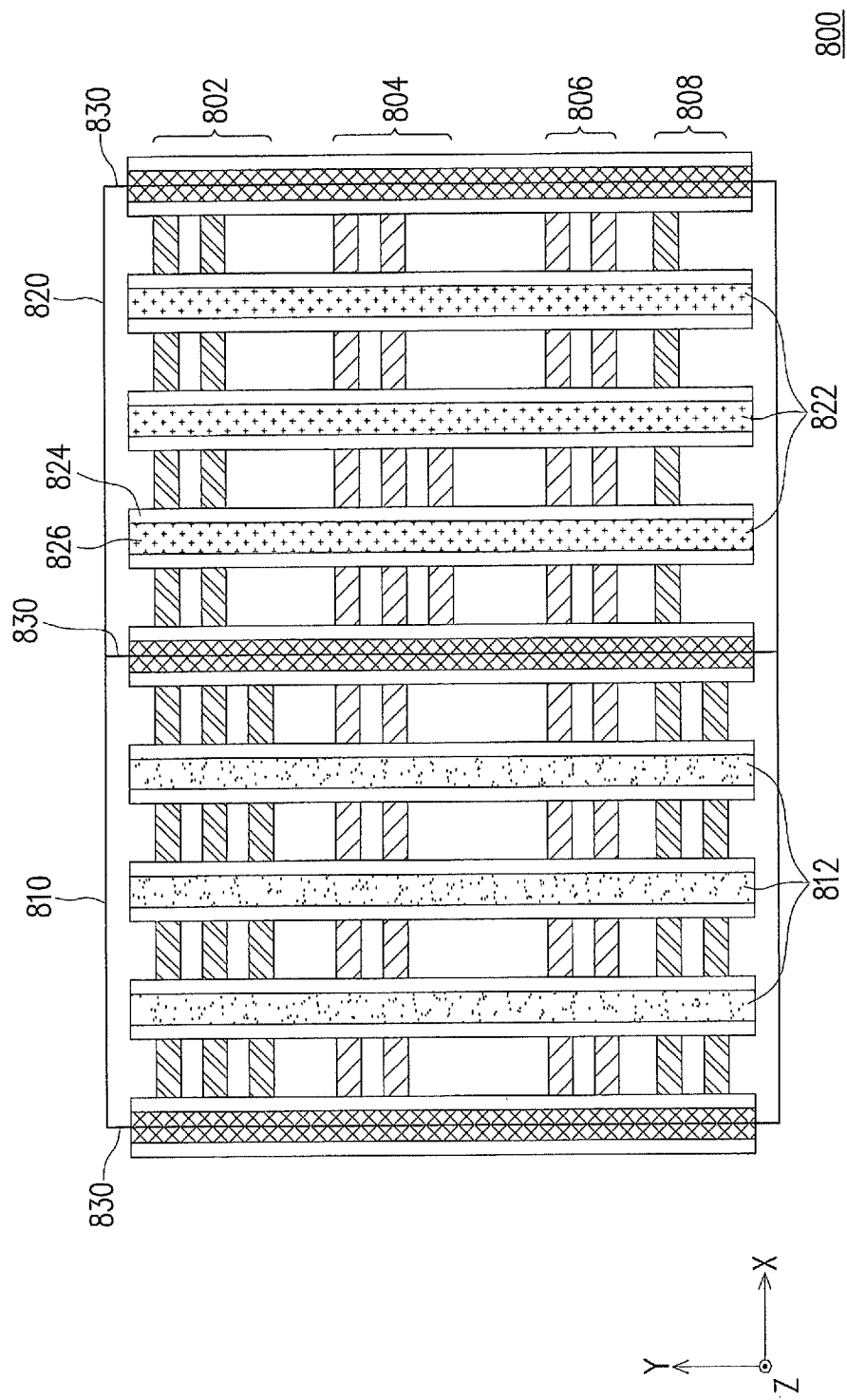
FIG. 8 illustrates a top view of a corresponding layout design of cells in a FinFET or nano-wire at one or more layout levels, in accordance with some embodiments of the present disclosure.

FIG. 8 illustrates a top view of a corresponding layout design 800 of cells in a FinFET or nano-wire at one or more layout levels, in accordance with some embodiments of the present disclosure. As shown in FIG. 8, the layout design 800 includes two adjacent cells 810, 820 arranged in a same row. Along this row, the cells 810 and 820 respectively include four groups of active regions 802, 804, 806, 808 continuously extending along the X direction across the cells 810 and 820. In this example, each active region of the cells 810, 820 includes a fin-shaped structure. Each active region in the active region groups 802, 804, 806, 808 may be a fin of a FinFET structure or a wire of a nano-wire structure that includes multiple layers arranged along the Z direction.

In one embodiment, the active regions of the cell 820 serve as source features or drain features of respective transistors for the cell 820 to perform a specific logic function. Each active region may comprise a semiconductor material, e.g. silicon, and may include n-type or p-type dopants. In one example, the active region groups 802, 808 are implanted with n-type dopants; and the active region groups 804, 806 are implanted with p-type dopants.

Further, the cell 820 includes a plurality of gate patterns 822 extending in a direction (the Y direction) substantially orthogonal to the direction (the X direction) along which the active regions extend to form respective gates of the p-type and n-type transistors, in accordance with some embodiments. In one embodiment, each gate pattern may include a dielectric layer 824 extending along the Y direction on the active region groups 802, 804, 806, 808, and a metal layer 826 extending along the Y direction on the dielectric layer 824.

In one embodiment, the active regions of the cell 810 do not perform any specific function except for the cell 810 to fill into the circuit positions. In the example shown in FIG. 8, the cell 820 may be referred to as a functional cell, and the cell 810 may be referred to as a filler cell. The cell 810 and the cell 820 have similar structures. After the functional cells are placed into a circuit design layout, the filler cells are placed into circuit positions where no functional cell is placed. In this example, the cell 810 includes a plurality of dummy gate patterns 812 extending in the Y direction. As shown in FIG. 8, the cells 810, 820 also have edge gates 830 disposed on the boundaries between adjacent cells. The dummy gates 812 and the edge gates 830 may have same structure and materials as the functional gates 822. For example, each of the dummy gates 812 and the edge gates 830 may include a dielectric layer 824 extending along the Y direction on the active regions 802, 804, 806, 808, and a metal layer 826 extending along the Y direction on the dielectric layer 824.

In one embodiment, while each active region in the active region groups 802, 804, 806, 808 has a fixed width across different cells, a quantity of active regions in at least one of the active region groups 802, 804, 806, 808 varies along the X direction. As shown in FIG. 8, a quantity of active regions in the active region group 802 changes across the two adjacent cells 810, 820, along the X direction. A quantity of active regions in the active region group 804 changes within the cell 820 along the X direction.

Figure 9:
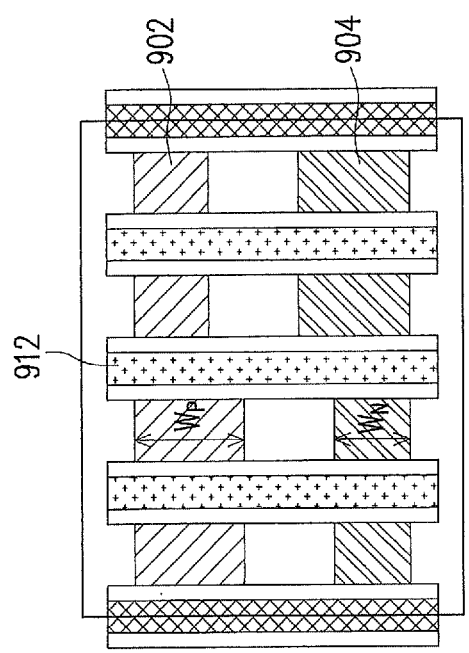
FIG. 9 illustrates a top view of a cell structure in a planar or nano-sheet, in accordance with some embodiments of the present disclosure.

FIG. 9 illustrates a top view of a cell structure 900 in a planar or nano-sheet, in accordance with some embodiments of the present disclosure. As shown in FIG. 9, the cell structure 900 includes a p-type active region 902 and an n-type active region 904 extending along the X direction. Different active regions 902, 904 are arranged along the Y direction that is orthogonal to the X direction, to form a planar or a sheet in a nano-sheet that has multiple sheets stacked along the Z direction.

As shown in FIG. 9, a width of the p-type active region 902 is marked as $W_P$ and a width of the n-type active region 904 is marked as $W_N$. Each of the $W_P$ and $W_N$ can be flexible within the cell, and can change along the X direction. For example, $W_P$ becomes narrower from left to right along the X direction; and $W_N$ becomes wider from left to right along the X direction. This means an active region width transition is allowed for both the p-type active region 902 and the n-type active region 904.

FIG. 9 illustrates a top view of a cell structure 900 in a planar or nano-sheet, in accordance with some embodiments of the present disclosure. As shown in FIG. 9, the cell structure 900 includes a p-type active region 902 and an n-type active region 904 extending along the X direction. Different active regions 902, 904 are arranged along the Y direction that is orthogonal to the X direction, to form a planar or a sheet in a nano-sheet that has multiple sheets stacked along the Z direction. The cell structure 900 also includes a plurality of gates 912 extending along the Y direction on and across the active regions 902, 904.

As shown in FIG. 9, a width of the p-type active region 902 is marked as $W_P$ and a width of the n-type active region 904 is marked as $W_N$. Each of the $W_P$ and $W_N$ can be flexible within the cell, and can change along the X direction. For example, $W_P$ becomes narrower from left to right along the X direction; and $W_N$ becomes wider from left to right along the X direction. This means an active region width transition is allowed for both the p-type active region 902 and the n-type active region 904.

Figure 10:
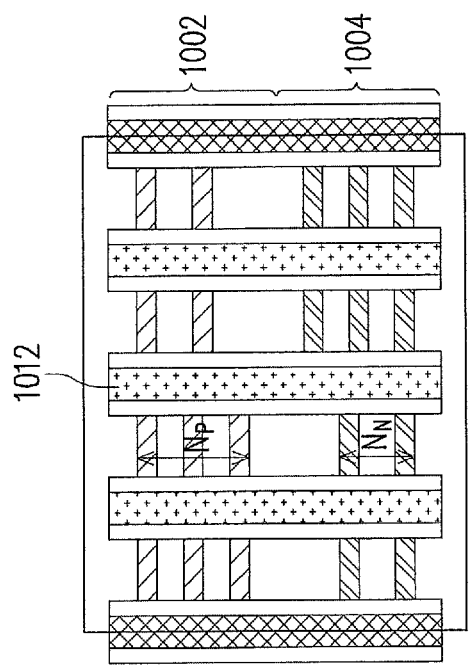
FIG. 10 illustrates a top view of a cell structure in a FinFET or nano-wire, in accordance with some embodiments of the present disclosure.

FIG. 10 illustrates a top view of a cell structure 1000 in a FinFET or nano-wire, in accordance with some embodiments of the present disclosure. As shown in FIG. 10, the cell structure 1000 includes a p-type active region group 1002 and an n-type active region group 1004 extending along the X direction. Different active region groups 1002, 1004 are arranged along the Y direction that is orthogonal to the X direction. The cell structure 1000 also includes a plurality of gates 1012 extending along the Y direction on and across the active region groups 1002, 1004. Each active region in the active region groups 1002, 1004 may be a fin of a FinFET structure or a wire of a nano-wire that has multiple layers stacked along the Z direction.

As shown in FIG. 10, a quantity of the p-type active regions in the active region group 1002 is marked as $N_P$, and a quantity of the n-type active regions in the active region group 1004 is marked as $N_N$. For simplicity of reference, both $N_P$ and $N_N$ are called fin numbers. For a nano-wire having a layer design shown in FIG. 10, a total wire number of the nano-wire is equal to a multiplication product of a layer number and the total fin numbers in one layer of the nano-wire.

As shown in FIG. 10, each of the $N_P$ and $N_N$ can be flexible within the cell, and can change along the X direction. For example, $N_P$ becomes smaller from 3 to 2 along the X direction; and $N_N$ becomes larger from 2 to 3 along the X direction. This means an active region number transition or fin number transition is allowed for both the p-type active region group 1002 and the n-type active region group 1004.

Figure 11:
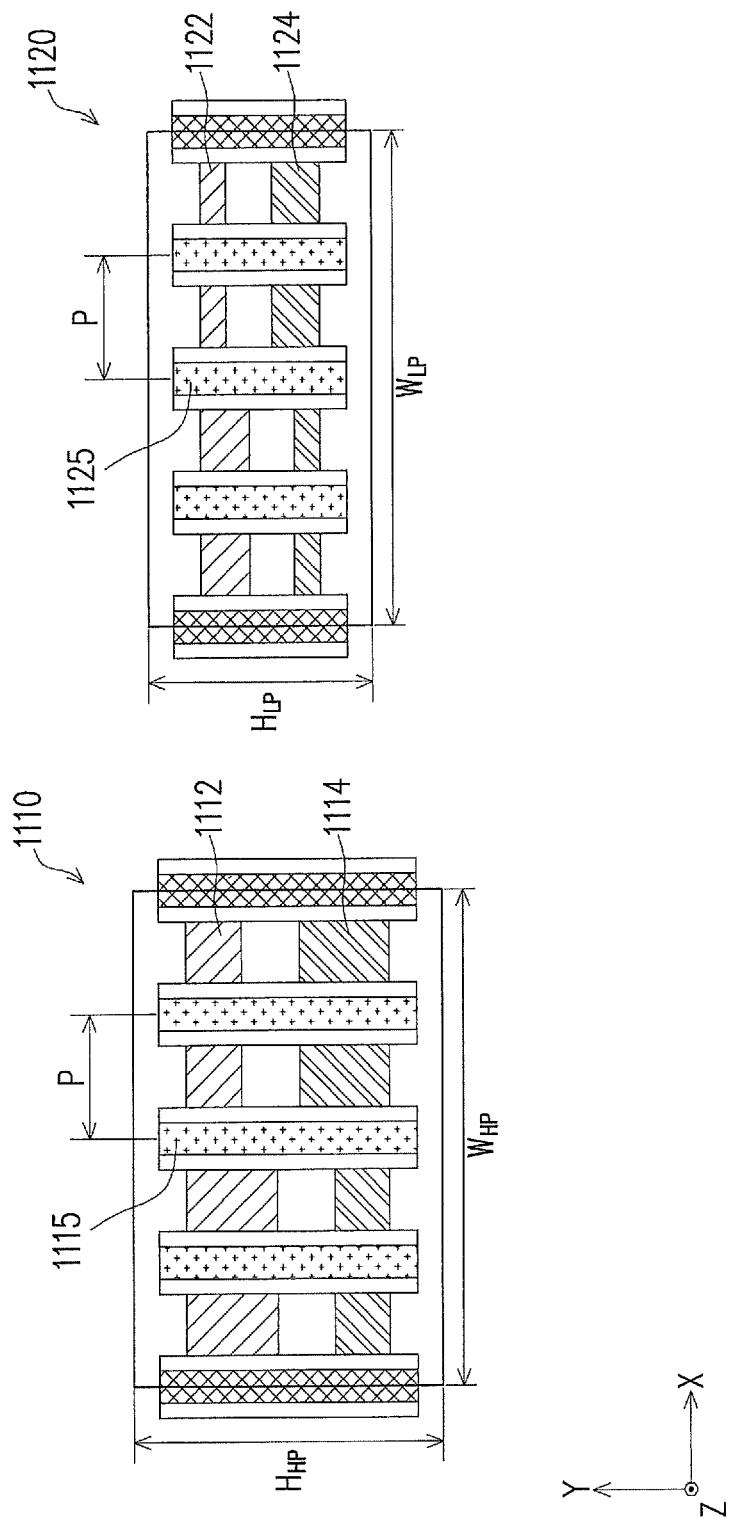
FIG. 11 illustrates cell families of high performance (HP) and low power (LP) cells, in accordance with some embodiments of the present disclosure.

FIG. 11 illustrates cell families of high performance (HP) and low power (LP) cells, in accordance with some embodiments of the present disclosure. As shown in FIG. 11, an HP cell 1110 includes a p-type active region 1112 and an n-type active region 1114 extending along the X direction. Different active regions 1112, 1114 are arranged along the Y direction that is orthogonal to the X direction. The HP cell 1110 also includes a plurality of gates 1115 extending along the Y direction on and across the active regions 1112, 1114. A distance between two adjacent gates 1115 is referred to as a gate pitch P. As shown in FIG. 11, the HP cell 1110 has a cell height Hip and a cell width $W_{HP}$. According to various embodiments, the cell width $W_{HP}$ is equal to n1*P, where n1 is a positive integer. According to various embodiments, the cell height $H_{HP}$ is equal to m1*P, where m1 is a positive integer between 2 and 1000.

As shown in FIG. 11, each of the active regions 1112, 1114 in the HP cell 1110 has a first width varying along the X direction. According to various embodiments, the first width varies between a first minimum width and a first maximum width that are associated with the cell height $H_{HP}$. In one example, the first width varies between 0 and ½ $H_{HP}$.

As shown in FIG. 11, an HP cell 1120 includes a p-type active region 1122 and an n-type active region 1124 extending along the X direction. Different active regions 1122, 1124 are arranged along the Y direction. The HP cell 1120 also includes a plurality of gates 1125 extending along the Y direction on and across the active regions 1122, 1124. Every two adjacent gates 1125 also have a gate pitch P from each other. The HP cell 1120 has a cell height $H_{LP}$ and a cell width $W_{LP}$. According to various embodiments, the cell width $W_{LP}$ is equal to n2*P, where n2 is a positive integer. According to various embodiments, the cell height $H_{LP}$ is equal to m2*P, where m2 is a positive integer between 2 and 1000, and m1>m2. As such, $H_{HP}>H_{LP}$.

As shown in FIG. 11, each of the active regions 1122, 1124 in the HP cell 1120 has a second width varying along the X direction. According to various embodiments, the second width varies between a second minimum width and a second maximum width that are associated with the cell height $H_{LP}$. In one example, the second width varies between 0 and ½ $H_{LP}$. In one embodiment, the first minimum width is different from the second minimum width; and the first maximum width is different from the second maximum width.

In some embodiments, the cells 1110, 1120 are retrieved from respective standard cell libraries having different cell heights. More specifically, the cell 1110 may be retrieved from a first standard cell library (hereinafter "cell library HP") including a plurality of cells, each of which share a first cell height (hereinafter "cell height $H_{HP}$"); and the cell 1120 may be retrieved from a second standard cell library (hereinafter "cell library LP") including a plurality of cells, each of which share a second cell height (hereinafter "cell height $H_{LP}$").

While the cells 1110, 1120 in FIG. 11 are HP and LP cells in a planar or nano-sheet, similar cell structures can be applied to a FinFET or nano-wire, where each cell has a number of fins extending along the X direction. Each fin has a fixed width, but a quantity of the fins in each cell may vary along the X direction. In one embodiment, a quantity of fins in an HP cell varies between a first minimum quantity and a first maximum quantity that are associated with the cell height $H_{HP}$; and a quantity of fins in an LP cell varies between a second minimum quantity and a second maximum quantity that are associated with the cell height $H_{LP}$. In one embodiment, the first minimum quantity is different from the second minimum quantity; and the first maximum quantity is different from the second maximum quantity. For example, the quantity of fins in an HP cell varies between 2 and floor($H_{HP}$/Hf); and the quantity of fins in an LP cell varies between 1 and floor($H_{LP}$/Hf), wherein Hf represents the fixed width of one fin, and floor(x) represents a floor function taking as input a real number x and gives as output the greatest integer less than or equal to x.

Comparing the two cells 1110, 1120 in FIG. 11, they may have a same gate pitch P, a same or different widths $W_{HP}$ and $W_{LP}$. Nevertheless, they have different cell heights, $H_{HP}$ and $H_{LP}$, where $H_{HP} > H_{LP}$. While the cell 1110 has a larger cell height to achieve a high performance (HP), the cell 1120 has a smaller cell height to achieve a low power (LP) and small area. An efficient circuit design would include mixing the two types of cells to achieve both high performance and low power.

Figure 12:
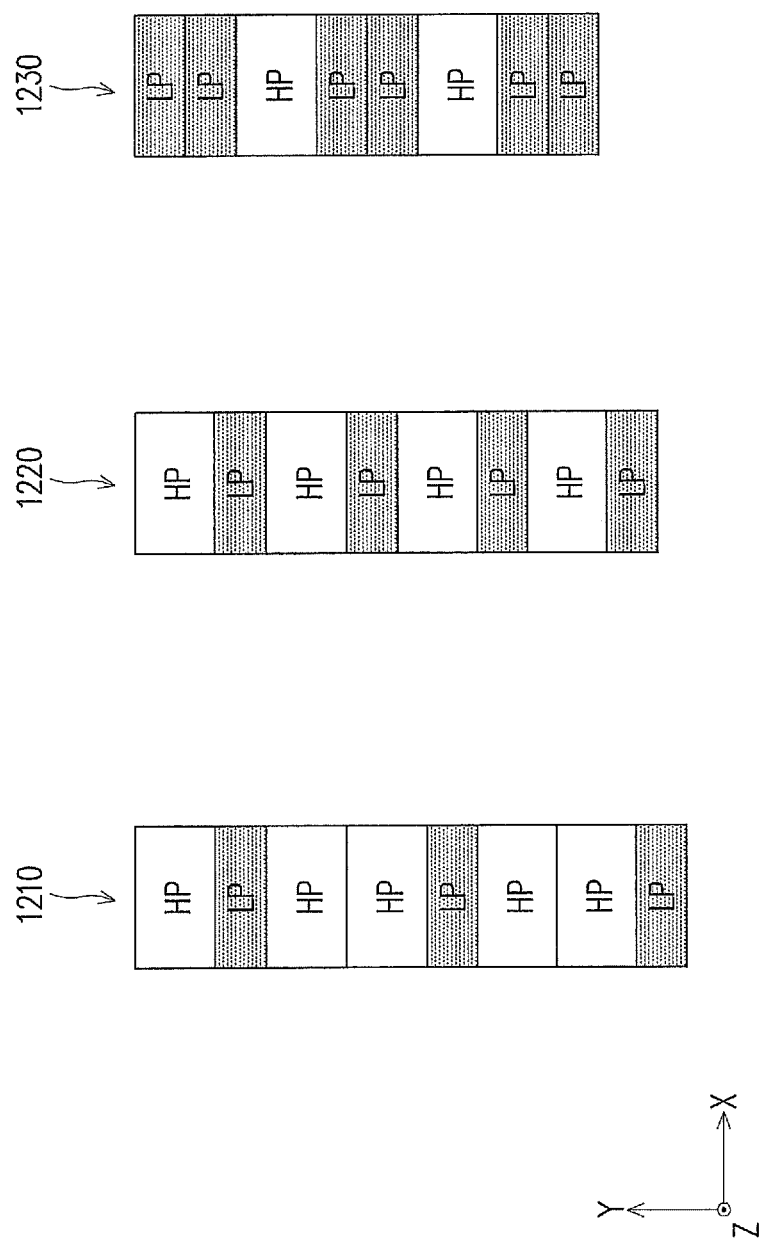
FIG. 12 illustrates layout designs with various HP to LP row ratios, in accordance with some embodiments of the present disclosure.

FIG. 12 illustrates layout designs with various HP to LP row ratios, in accordance with some embodiments of the present disclosure. Each layout design in FIG. 12 includes a first plurality of cell rows (HP rows) extending in the X direction, and a second plurality of cell rows (LP rows) extending in the X direction. Each HP row in FIG. 12 has a first row height and comprises a plurality of HP cells as the HP cell 1110 disclosed in FIG. 11; and each LP row in FIG. 12 has a second row height different from the first row height and comprises a plurality of LP cells as the LP cell 1120 disclosed in FIG. 11. In one embodiment, the row height of each row corresponds to the cell height of a cell placed therein. For example, the row height of each row is substantially equal to the cell height of the cell placed therein.

As shown in FIG. 12, the HP rows and the LP rows are mixed and arranged, along the Y perpendicular to the X direction, according to a ratio between a number of the HP rows and a number of the LP rows. For example, the ratio between a quantity of HP rows and a quantity of LP rows is 2/1 for the layout design 1210, is 1/1 for the layout design 1220, and is ½ for the layout design 1230. According to various embodiment, any other row ratios, e.g. ⅓, ⅔, 3/2, ¼, 3/1, 4/1, etc., remain within the scope of the present disclosure.

Figure 13:
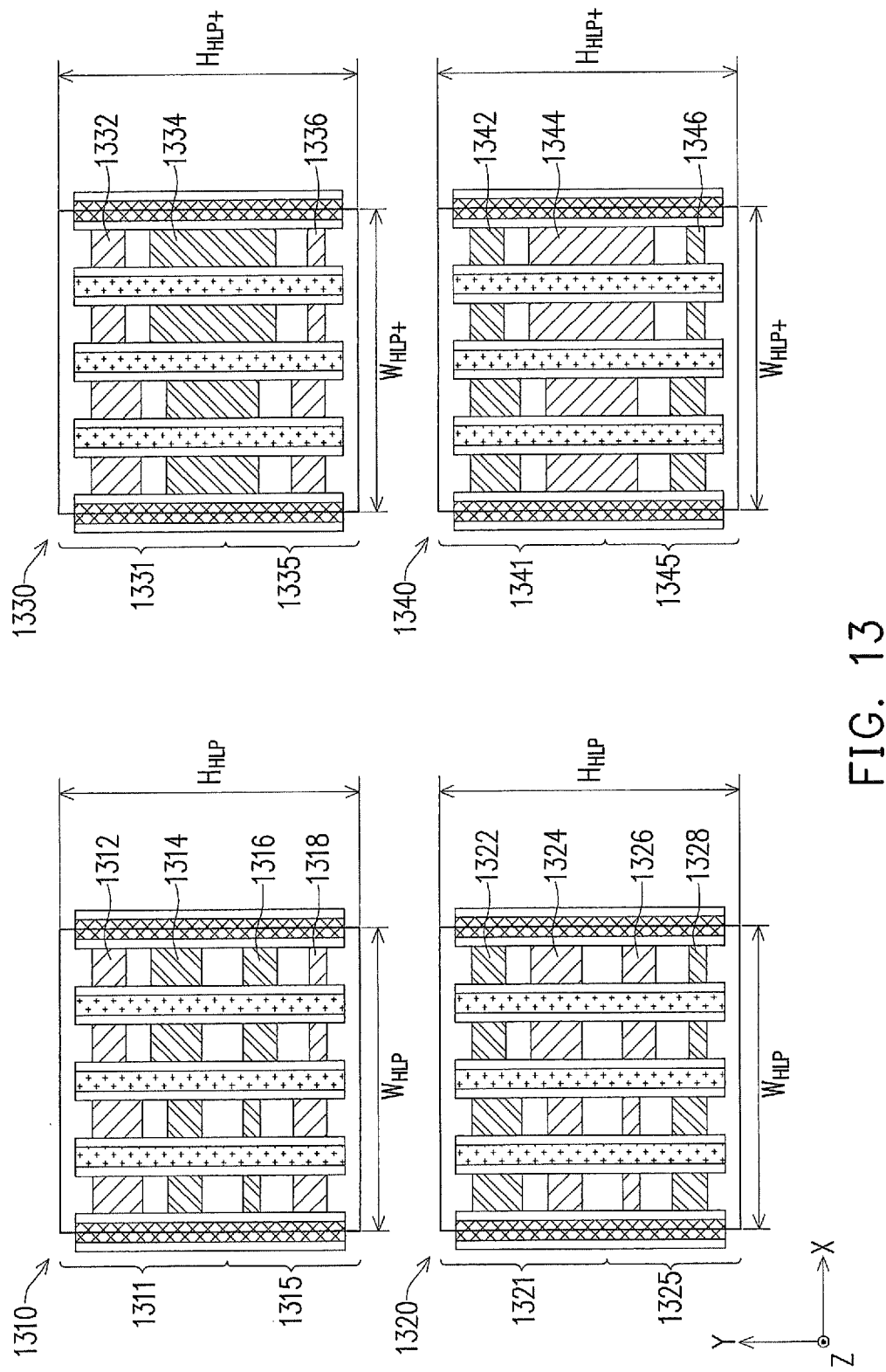
FIG. 13 illustrates cell families of merged HP-LP cells, in accordance with some embodiments of the present disclosure.

FIG. 13 illustrates cell families of merged HP-LP cells 1310, 1320, 1330, 1340, in accordance with some embodiments of the present disclosure. As shown in FIG. 13, an HLP cell 1310 is formed by concatenating an HP cell 1311 and an LP cell 1315 along the Y direction. The HLP cell 1310 includes two p-type active regions 1312, 1318 and two n-type active regions 1314, 1316, all extending along the X direction. Different active regions 1312, 1314, 1316, 1318 are arranged along the Y direction. As shown in FIG. 13, the HLP cell 1310 has a cell height $H_{HLP}$ and a cell width $W_{HLP}$. Compared to the cell heights of the HP and LP cells in FIG. 11, the cell height relationship is: $H_{HLP} = H_{HP} + H_{LP}$. As shown in FIG. 13, each of the active regions 1312, 1314, 1316, 1318 in the $H_{LP}$ cell 1310 has a width varying along the X direction, e.g. between 0 and ½ $H_{HP}$.

Similar to the HLP cell 1310, an HLP cell 1320 in FIG. 13 is formed by concatenating an HP cell 1321 and an LP cell 1325 along the Y direction. The HLP cell 1320 includes two n-type active regions 1322, 1328 and two p-type active regions 1324, 1326, all extending along the X direction. Different active regions 1322, 1324, 1326, 1328 are arranged along the Y direction. While the HLP cell 1310 has two adjacent n-type active regions 1314, 1316 arranged along the Y direction, the HLP cell 1320 has two adjacent p-type active regions 1324, 1326 arranged along the Y direction. As shown in FIG. 13, the HLP cell 1320 also has a cell height $H_{HLP}$ and a cell width $W_{HLP}$. Each of the active regions 1322, 1324, 1326, 1328 in the HLP cell 1320 has a width varying along the X direction, e.g. between 0 and ½ $H_{HP}$.

Similar to the HLP cell 1310, an HLP+ cell 1330 in FIG. 13 is formed by concatenating an HP cell 1331 and an LP cell 1335 along the Y direction, and merging two adjacent n-type active regions to be a merged active region. The HLP+ cell 1330 includes two p-type active regions 1332, 1336 and a merged n-type active region 1334, all extending along the X direction. Different active regions 1332, 1334, 1336 are arranged along the Y direction. As shown in FIG. 13, the HLP+ cell 1330 has a cell height $H_{HLP+}$ and a cell width $W_{HLP+}$. Compared to the cell heights of the HP and LP cells in FIG. 11, the cell height relationship is: $H_{HLP+} = H_{HP} + H_{LP}$. As shown in FIG. 13, each of the active regions 1332, 1334, 1336 in the HLP+ cell 1330 has a width varying along the X direction, e.g. between 0 and ½ $H_{HLP+}$.

Similar to the HLP cell 1320, an HLP+ cell 1340 in FIG. 13 is formed by concatenating an HP cell 1341 and an LP cell 1345 along the Y direction, and merging two adjacent p-type active regions to be a merged active region. The HLP+ cell 1340 includes two n-type active regions 1342, 1346 and a merged p-type active region 1344, all extending along the X direction. Different active regions 1342, 1344, 1346 are arranged along the Y direction. As shown in FIG. 13, the HLP+ cell 1340 also has a cell height $H_{HLP+}$ and a cell width $W_{HLP+}$. As shown in FIG. 13, each of the active regions 1342, 1344, 1346 in the HLP+ cell 1340 has a width varying along the X direction, e.g. between 0 and ½ $H_{HLP+}$. According to various embodiments, each of the cell width $W_{HLP}$ of HLP cells and the cell width $W^{HLP+}$ of HLP+ cells may be equal to n*P, where n is a positive integer and P is the gate pitch between two adjacent gates in the cell.

In some embodiments, the merged HP-LP cells 1310, 1320, 1330, 1340 are retrieved from respective standard cell libraries having different cell heights. More specifically, the HLP cells 1310, 1320 may be retrieved from a third standard cell library (hereinafter "cell library HLP") including a plurality of cells, each of which share a third cell height (hereinafter "cell height $H_{HLP}$"); and the HLP+ cells 1330, 1340 may be retrieved from a fourth standard cell library (hereinafter "cell library HLP+") including a plurality of cells, each of which share a fourth cell height (hereinafter "cell height $H_{HLP+}$"). In one embodiment, $H_{HLP} = H_{HLP+} = H_{HP} + H_{LP}$. When mixing HP and LP cells to achieve both high performance and low power in a layout design, an HLP cell may be counted as one HP cell and one LP cell; and an HLP+ cell may also be counted as one HP cell and one LP cell.

While the cells 1310, 1320, 1330, 1340 in FIG. 13 are HLP and HLP+ cells in a planar or nano-sheet, similar cell structures can be applied to a FinFET or nano-wire, where each cell has a number of fins extending along the X direction. Each fin has a fixed width, but a quantity of the fins in each cell may vary along the X direction. In one embodiment, a quantity of fins in an HLP cell or an HLP+ cell is equal to a sum of a first quantity of fins in an HP cell and a second quantity of fins in an LP cell. In one embodiment, fins of an active region group in an HLP+ cell is formed by merging fins of two adjacent active region groups of an HP cell and an LP cell.

Figure 14:
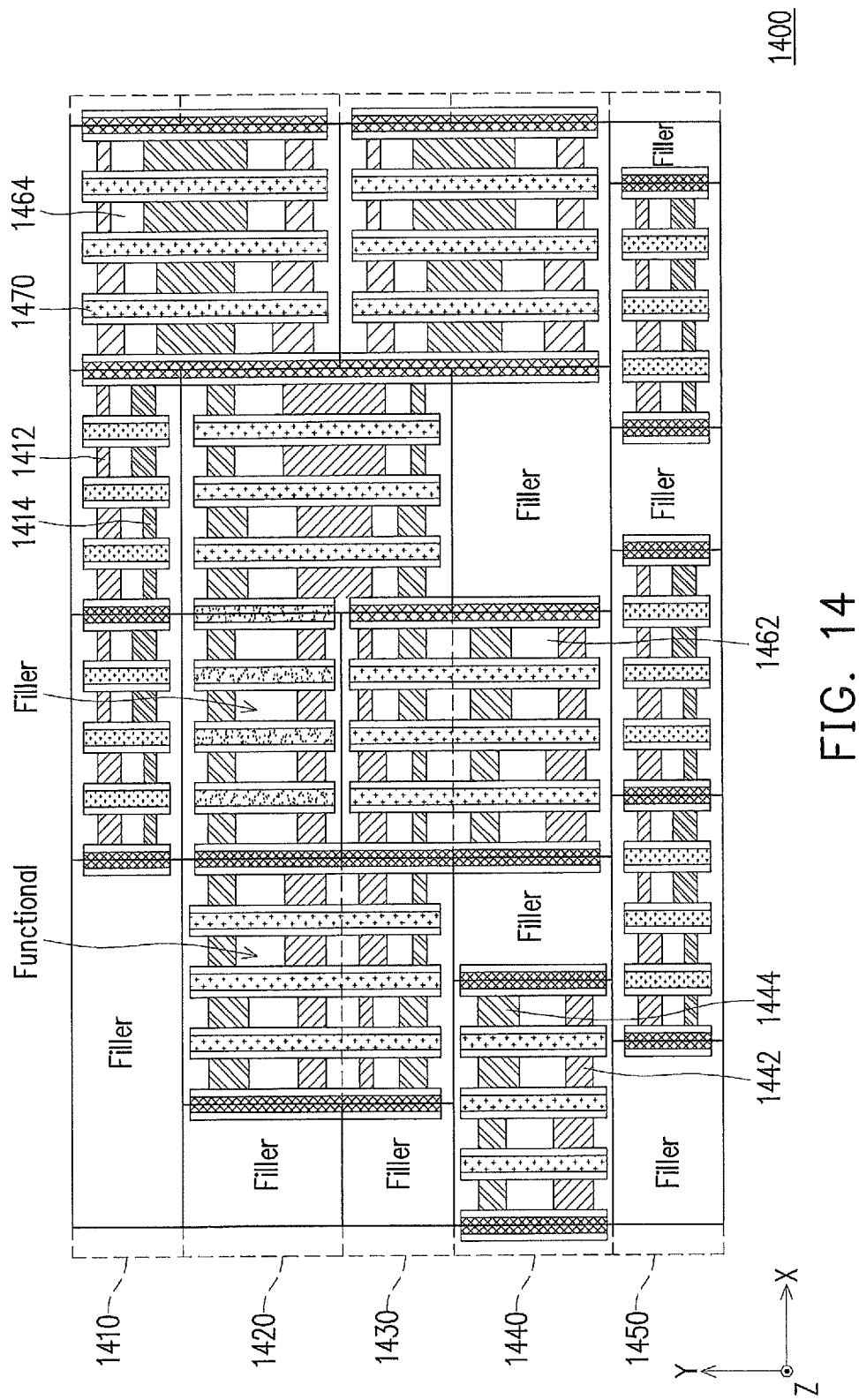
FIG. 14 illustrates a top view of a corresponding layout design of an exemplary integrated circuit with a 1/1 HP to LP row ratio, in accordance with some embodiments of the present disclosure.

FIG. 14 illustrates a top view of a corresponding layout design 1400 of an exemplary integrated circuit with a 1/1 HP to LP row ratio, in accordance with some embodiments of the present disclosure. As shown in FIG. 14, the layout design 1400 of the integrated circuit includes a first plurality of cell rows 1410, 1430, 1450 extending in a first direction (the X direction), and a second plurality of cell rows 1420, 1440 extending in the first direction. Each of the first plurality of cell rows 1410, 1430, 1450 has a first row height and comprises a plurality of first cells disposed therein; each of the second plurality of cell rows 1420, 1440 has a second row height different from the first row height and comprises a plurality of second cells disposed therein. In one embodiment, the first plurality of cell rows 1410, 1430, 1450 are LP rows and the first cells are LP cells; the second plurality of cell rows 1420, 1440 are HP rows and the second cells are HP cells. The HP rows and LP rows are mixed, along a second direction (the Y direction) perpendicular to the first direction, according to a 1/1 ratio. In the example shown in FIG. 14, the HP rows and LP rows are alternated along the Y direction according to the 1/1 ratio.

As shown in FIG. 14, the LP cells in each LP row comprise a first plurality of active regions 1412, 1414 each of which continuously extends across the LP cells in the X direction; and the HP cells in each HP row comprise a second plurality of active regions 1442, 1444 each of which continuously extends across the HP cells in the X direction. At least one active region of the first and second pluralities of active regions has a width varying along the X direction. In the example shown in FIG. 14, each LP cell has a cell height equal to a row height of the LP rows 1410, 1430, 1450; and each HP cell has a cell height equal to a row height of the HP rows 1420, 1440.

As shown in FIG. 14, the layout design 1400 may also include an HLP cell 1462, which is a merged cell formed together by an LP cell and an HP cell that are adjacent to each other along the Y direction. As such, the HLP cell 1462 has a cell height equal to a sum of the LP row height and the HP row height.

As shown in FIG. 14, the layout design 1400 may also include an HLP+ cell 1464, which is a merged cell formed together by an LP cell and an HP cell that are adjacent to each other along the Y direction, and by merging two adjacent active regions of the LP cell and the HP cell to form a merged active region. The merged active region extends across the LP cell and the HP cell along the Y direction, and has a width varying along the X direction. The HLP+ cell 1464 has a cell height equal to a sum of the LP row height and the HP row height. As shown in FIG. 14, each LP cell in the LP rows 1410, 1430, 1450 may be either an independent LP cell, or an LP cell portion of a merged HP-LP cell (e.g. an HLP cell or an HLP+ cell); each HP cell in the HP rows 1420, 1440 may be either an independent HP cell, or an HP cell portion of a merged HP-LP cell (e.g. an HLP cell or an HLP+ cell).

In the example shown in FIG. 14, a cell width of a cell may be flexible and independent of whether the cell is: an HP cell, an LP cell, an HLP cell or an HLP+ cell. But a cell height of an LP cell is shorter than a cell height of an HP cell. In addition, a cell height of an HLP cell is equal to a cell height of an HLP+ cell, and is equal to a sum of the cell heights of an LP cell and an HP cell.

As shown in FIG. 14, each cell in the layout design 1400 may be either a functional cell performing a designed function, or a filler cell that does not perform any specific function except filling into the circuit spaces between functional cells. The functional cells and the filler cells may have similar structures. Each functional cell can have a cell structure same as one of: an HP cell, an LP cell, an HLP cell or an HLP+ cell. Similarly, each filler cell can also have a cell structure same as one of: an HP cell, an LP cell, an HLP cell or an HLP+ cell. During fabrication of the circuit, the filler cells may be placed into the spaces between the functional cells, after the functional cells' placement is finished.

In this embodiment, each of the gate patterns 1470 forms a straight line through different rows of the integrated circuit. That is, in each gate pattern 1470, poly gates in different rows align with each other along a same line in the Y direction. In other embodiments, poly gates in different rows may not align with each other in the Y direction. While the layout design 1400 is based on a planar or nano-sheet having continuous active regions, a similar layout design may be applied to a FinFET or nano-wire having quantized active regions or fins.

Figure 15:
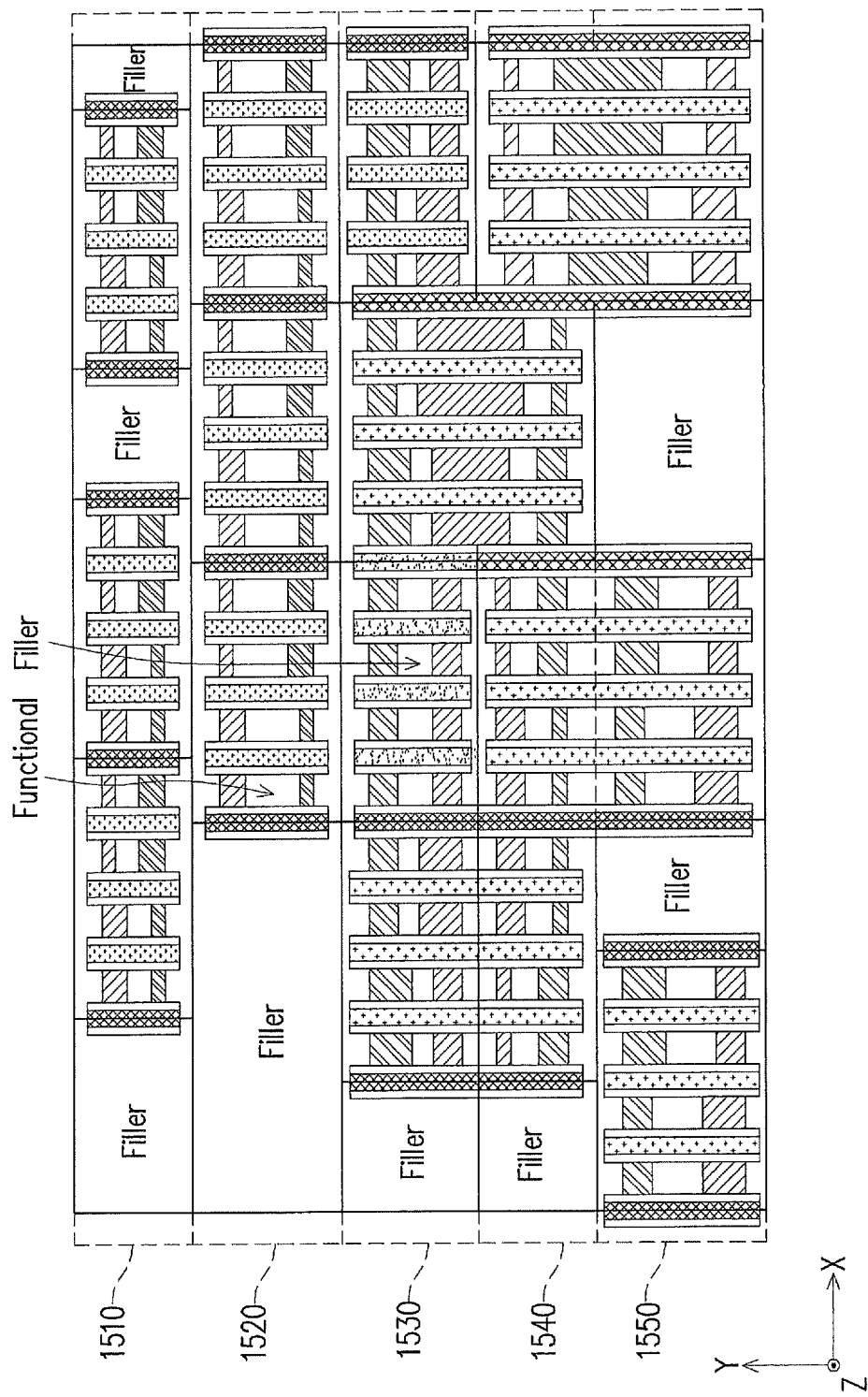
FIG. 15 illustrates a top view of a corresponding layout design of an exemplary integrated circuit with a 2/1 HP to LP row ratio, in accordance with some embodiments of the present disclosure.

FIG. 15 illustrates a top view of a corresponding layout design 1500 of an exemplary integrated circuit with a 2/1 HP to LP row ratio, in accordance with some embodiments of the present disclosure. As shown in FIG. 15, the layout design 1500 of the integrated circuit includes a first plurality of cell rows (LP rows) 1510, 1540 extending in the X direction, and a second plurality of cell rows (HP rows) 1520, 1530, 1550 extending in the X direction. Each of the LP rows 1510, 1540 has a first row height and comprises a plurality of LP cells disposed therein; each of the HP rows 1520, 1530, 1550 has a second row height different from the first row height and comprises a plurality of HP cells disposed therein. The layout design 1500 is similar to the layout design 1400 in FIG. 14, except that the HP rows and LP rows in the layout design 1500 are mixed, along the Y direction perpendicular to the X direction, according to a 2/1 ratio. In the example shown in FIG. 15, the HP rows and LP rows are alternated by a 2:1 ratio along the Y direction. Because of the 2:1 ratio, given a total row number of a layout design, the layout design 1500 has a smaller number of adjacent HP and LP rows compared to the layout design 1400. As such, compared to the layout design 1400 in FIG. 14, the layout design 1500 has less available cell positions for placing an HLP cell or an HLP+ cell.

Figure 16:
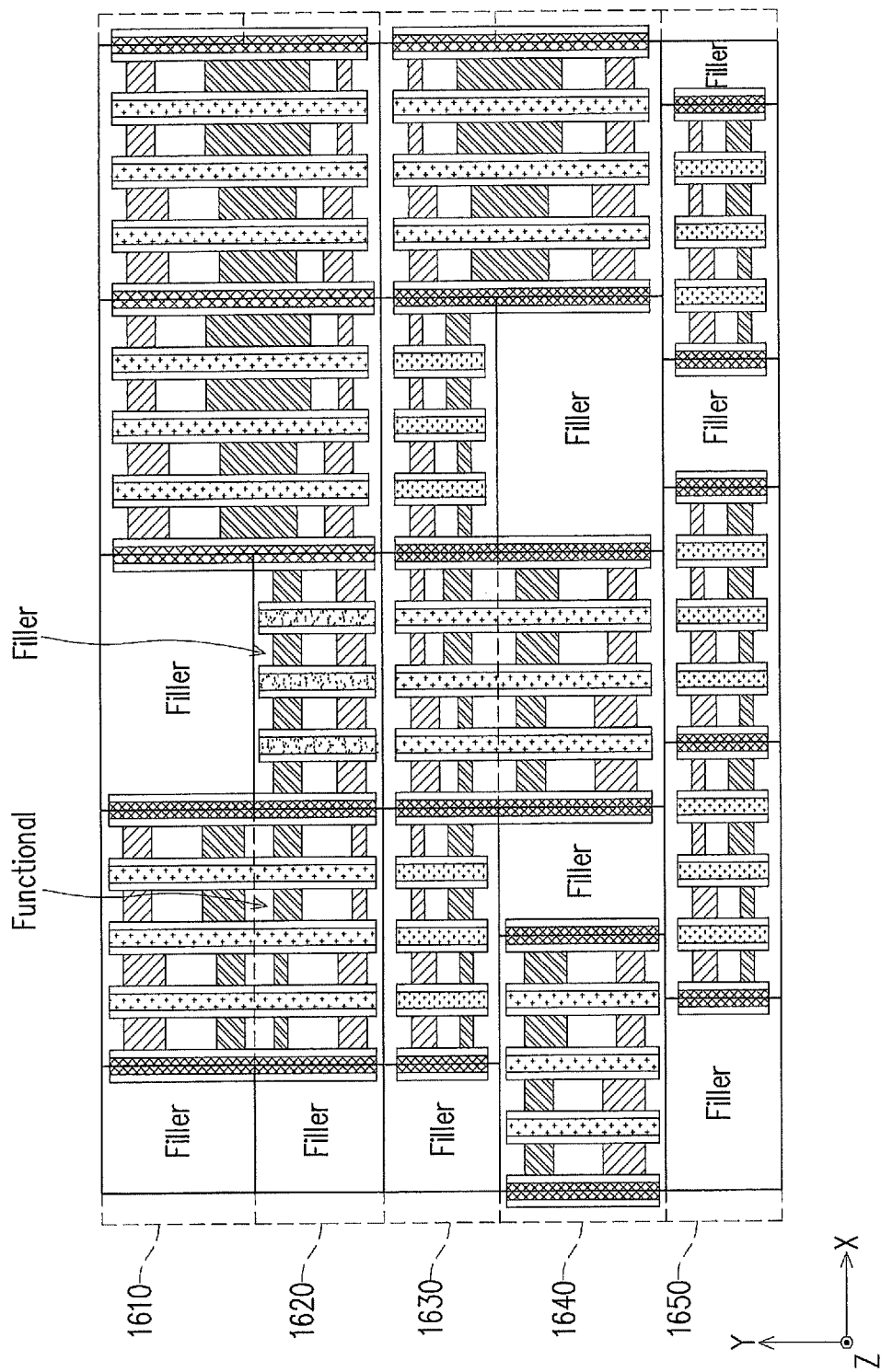
FIG. 16 illustrates a top view of a corresponding layout design of an exemplary integrated circuit with a 1/2 HP to LP row ratio, in accordance with some embodiments of the present disclosure.

FIG. 16 illustrates a top view of a corresponding layout design 1600 of an exemplary integrated circuit with a ½ HP to LP row ratio, in accordance with some embodiments of the present disclosure. As shown in FIG. 16, the layout design 1600 of the integrated circuit includes a first plurality of cell rows (HP rows) 1610, 1640 extending in the X direction, and a second plurality of cell rows (LP rows) 1620, 1630, 1650 extending in the X direction. Each of the HP rows 1610, 1640 has a first row height and comprises a plurality of HP cells disposed therein; each of the LP rows 1620, 1630, 1650 has a second row height different from the first row height and comprises a plurality of LP cells disposed therein. The layout design 1600 is similar to the layout design 1400 in FIG. 14, except that the HP rows and LP rows in the layout design 1600 are mixed, along the Y direction perpendicular to the X direction, according to a 1/2 ratio. In the example shown in FIG. 16, the HP rows and LP rows are alternated along the Y direction by a 1:2 ratio. Because of the 1:2 ratio, given a total row number of a layout design, the layout design 1600 has a smaller number of adjacent HP and LP rows compared to the layout design 1400. As such, compared to the layout design 1400 in FIG. 14, the layout design 1600 has less available cell positions for placing an HLP cell or an HLP+ cell.

Figure 17:
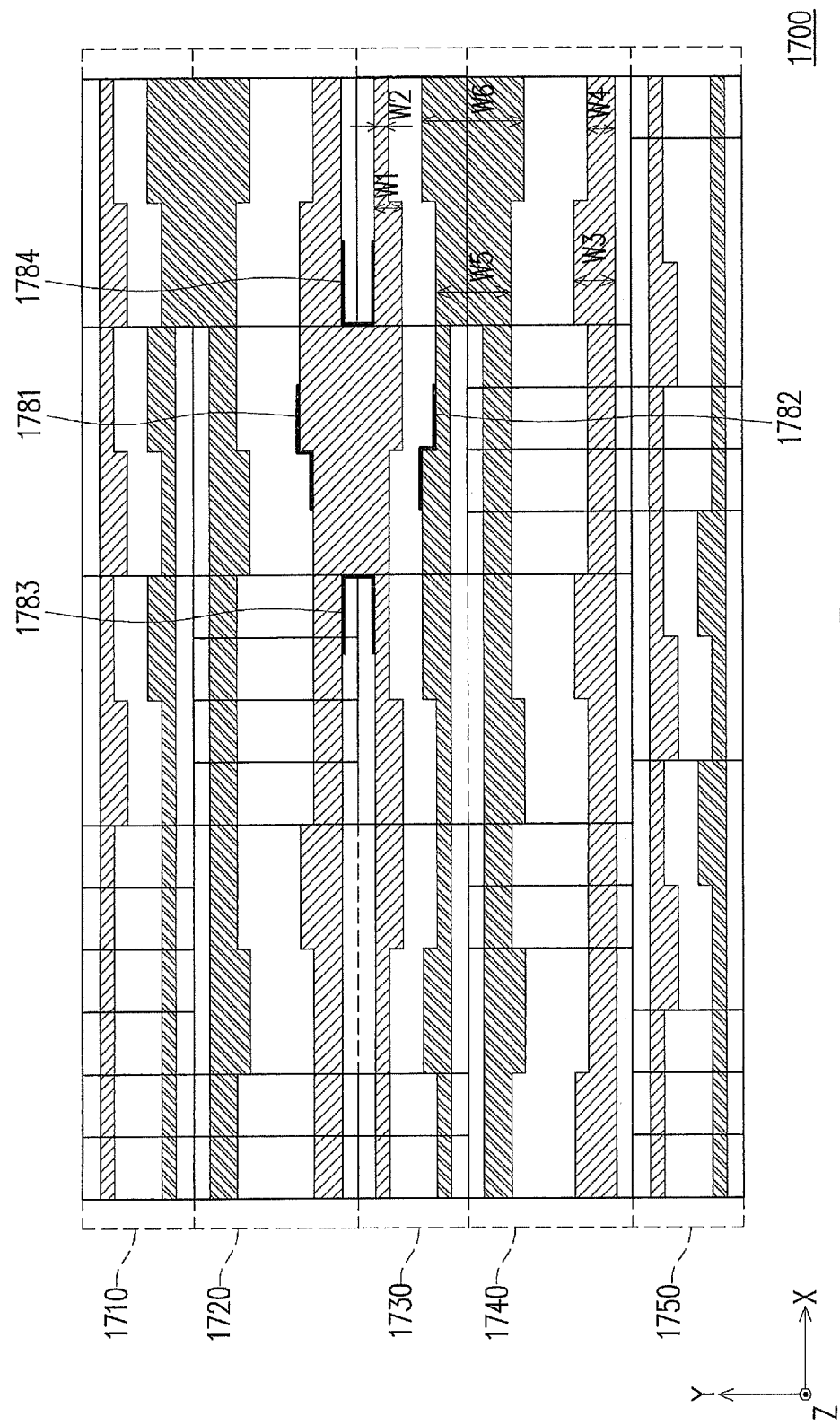
FIG. 17 illustrates a top view of a corresponding layout design of cells in a planar or nano-sheet with flexible active region width and flexible active region transition, in accordance with some embodiments of the present disclosure.

FIG. 17 illustrates a top view of a corresponding layout design 1700 of cells in a planar or nano-sheet with flexible active region width and flexible active region transition, in accordance with some embodiments of the present disclosure. The gate patterns are not shown in FIG. 17 for simplicity. As shown in FIG. 17, the layout design 1700 of the integrated circuit includes a first plurality of cell rows (LP rows) 1710, 1730, 1750 extending in the X direction, and a second plurality of cell rows (HP rows) 1720, 1740 extending in the X direction. Each of the LP rows 1710, 1730, 1750 has a first row height and comprises a plurality of LP cells disposed therein; each of the HP rows 1720, 1740 has a second row height different from the first row height and comprises a plurality of HP cells disposed therein. The HP rows and LP rows in the layout design 1700 are alternated along the Y direction by a 1:1 ratio. In one embodiment, some cells in the layout design 1700 are functional cells, and other cells in the layout design 1700 are filler cells.

As shown in FIG. 17, there are p-type and n-type active regions extending along the X direction in and across the HP, LP, HLP and HLP+ cells. The active region width or sheet width may be flexible and vary along the X direction. In one example, a p-type active region in the LP row 1730 may have a width W1 at one position and a width W2 at another position, along the X direction. In this example, W1>W2, and both W1 and W2 are smaller than ½ $H_{LP}$, where $H_{LP}$ is a cell height of an LP cell and a row height of the LP row 1730.

In another example, a p-type active region in the HP row 1740 may have a width W3 at one position and a width W4 at another position, along the X direction. In this example, W3>W4, and both W3 and W4 are smaller than ½ HP, where $H_{HP}$ is a cell height of an HP cell and a row height of the HP row 1740.

In yet another example, an n-type merged active region disposed across the LP row 1730 and the HP row 1740 may have a width W5 at one position and a width W6 at another position, along the X direction. In this example, W5<W6, and both W5 and W6 are smaller than ½ ($H_{LP}+H_{HP}$)=½$H_{HLP+}$, where $H_{HLP+}$ is a cell height of an HLP+ cell as shown in FIG. 13 and is equal to a sum of the row heights of the LP row 1730 and the HP row 1740.

As shown in FIG. 17, there are various active region transitions 1781, 1782, 1783, 1784 in the layout design 1700, due to the varying sheet width and/or the merged sheets. In one example, an active region is continuously transitioned from a narrower sheet to a wider sheet along the X direction, at the transition 1781. In one example, an active region is continuously transitioned from a wider sheet to a narrower sheet along the X direction, at the transition 1782.

In another example, two active regions are transitioned to one merged active region along the X direction, at the transition 1783. In yet another example, one merged active region is split into two active regions along the X direction, at the transition 1784.

Figure 18:
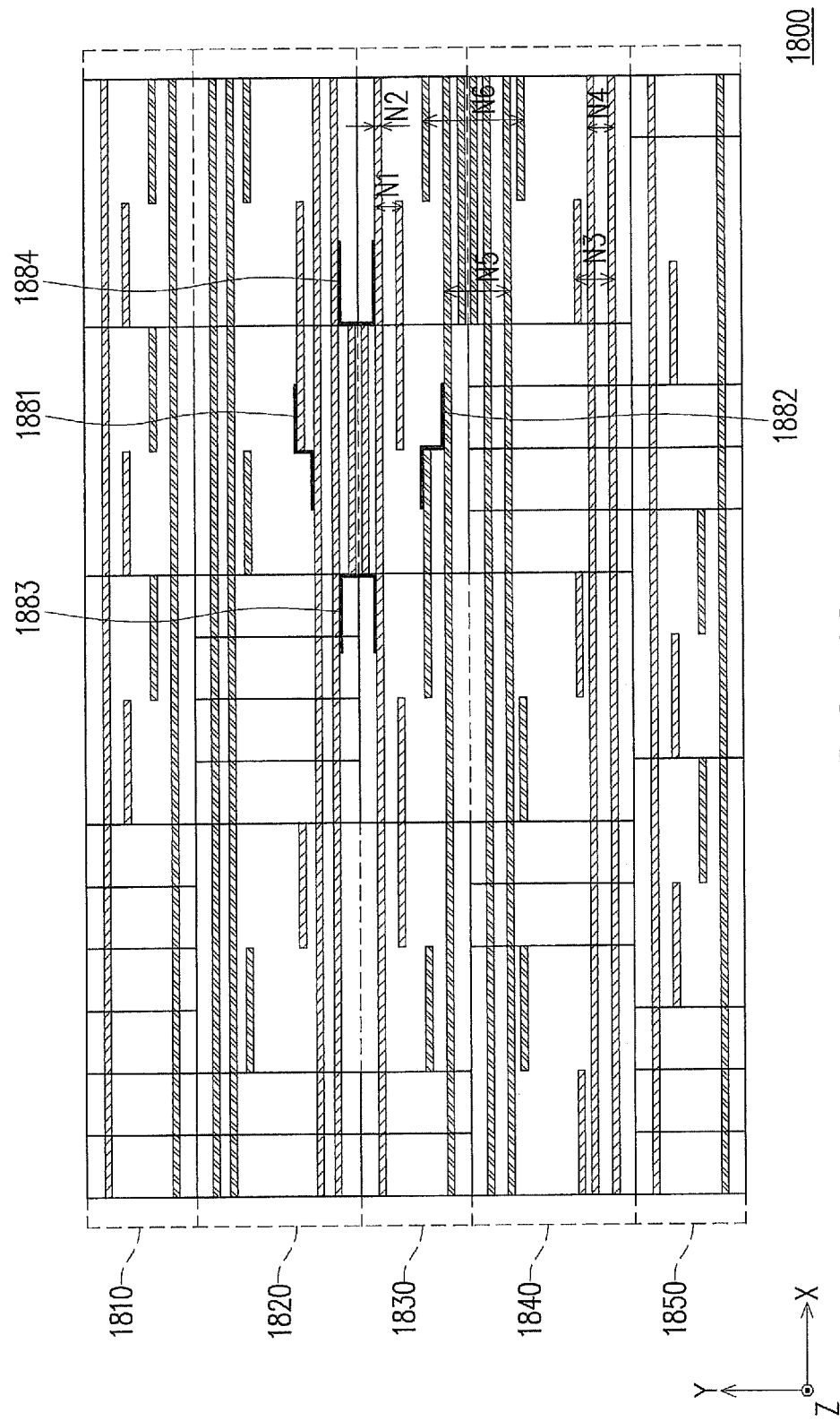
FIG. 18 illustrates a top view of a corresponding layout design of cells in a FinFET or nano-wire with flexible fin number and flexible active region transition, in accordance with some embodiments of the present disclosure.

FIG. 18 illustrates a top view of a corresponding layout design 1800 of cells in a FinFET or nano-wire with flexible fin number and flexible active region transition, in accordance with some embodiments of the present disclosure. The gate patterns are not shown in FIG. 18 for simplicity. As shown in FIG. 18, the layout design 1800 of the integrated circuit includes a first plurality of cell rows (LP rows) 1810, 1830, 1850 extending in the X direction, and a second plurality of cell rows (HP rows) 1820, 1840 extending in the X direction. Each of the LP rows 1810, 1830, 1850 has a first row height and comprises a plurality of LP cells disposed therein; each of the HP rows 1820, 1840 has a second row height different from the first row height and comprises a plurality of HP cells disposed therein. The HP rows and LP rows in the layout design 1800 are alternated along the Y direction by a 1:1 ratio. In one embodiment, some cells in the layout design 1800 are functional cells, and other cells in the layout design 1800 are filler cells.

As shown in FIG. 18, there are p-type and n-type active region groups extending along the X direction in and across the HP, LP, HLP and HLP+ cells. The fin number or wire number of each active region group may be flexible and vary along the X direction. In one example, a p-type active region group in the LP row 1830 may have N1 fins at one position and N2 fins at another position, along the X direction. In this example, N1>N2, and both of them are positive integers. In another example, a p-type active region group in the HP row 1840 may have N3 fins at one position and N4 fins at another position, along the X direction. In this example, N3>N4, and both of them are positive integers. In yet another example, an n-type merged active region group disposed across the LP row 1830 and the HP row 1840 may have N5 fins at one position and N6 fins at another position, along the X direction. In this example, N5<N6, and both of them are positive integers.

As shown in FIG. 18, there are various active region transitions 1881, 1882, 1883, 1884 in the layout design 1800, due to the varying fin numbers and/or the merged fin groups. In one example, a fin group or active region group is continuously transitioned from a smaller number of fins to a larger number of fins along the X direction, at the transition 1881. In one example, a fin group is continuously transitioned from a larger number of fins to a smaller number of fins along the X direction, at the transition 1882.

In another example, two fin groups are transitioned to one merged fin group along the X direction, at the transition 1883, where at least one fin emerges after the transition 1883 from left to right along the X direction. In yet another example, one merged fin group is split into two fin groups along the X direction, at the transition 1884, where at least one fin stops after the transition 1884 from left to right along the X direction.

Figure 19:
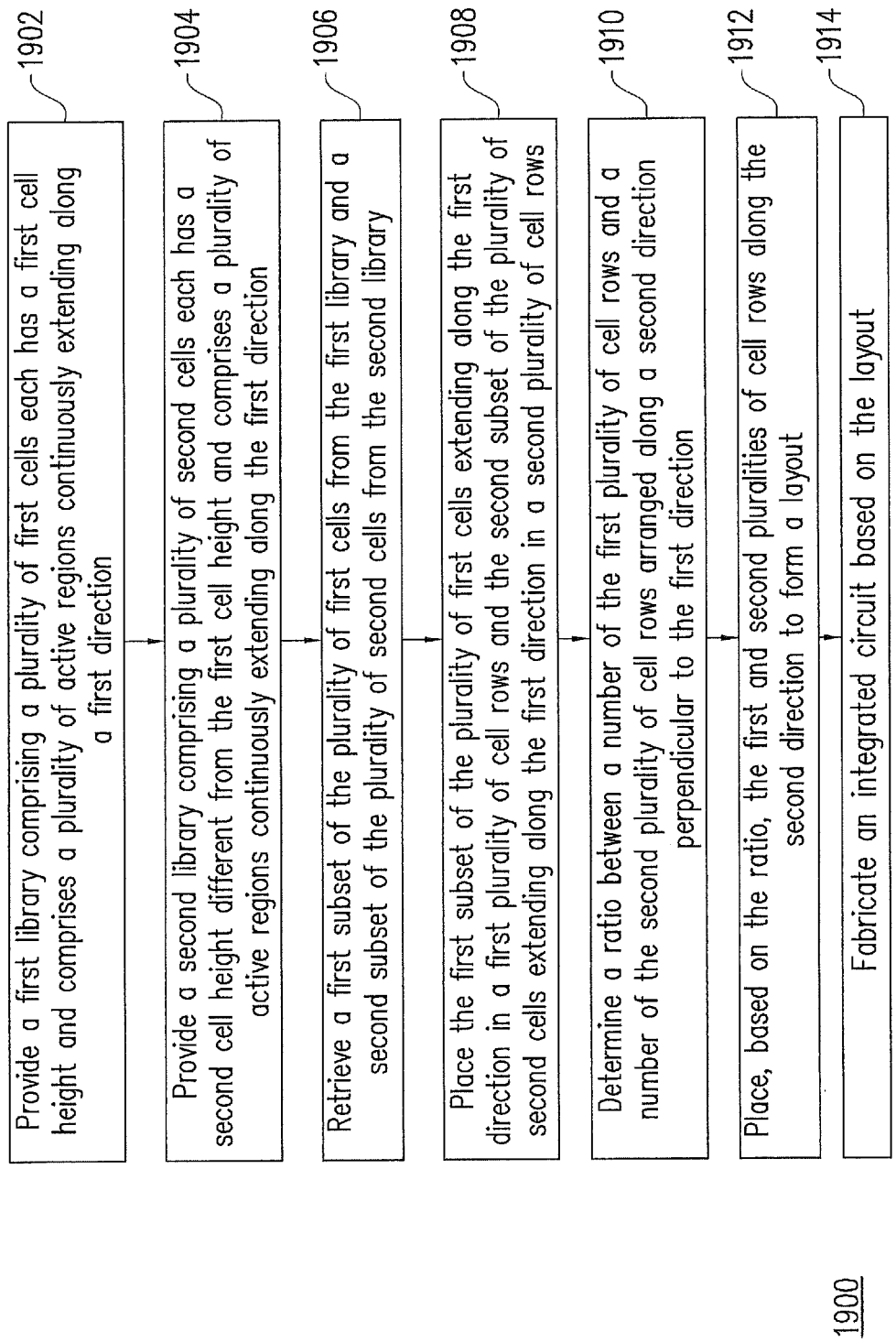
FIG. 19 illustrates a flow chart of an exemplary method for generating a physical layout of an integrated circuit for fabrication, in accordance with some embodiments of the present disclosure.

FIG. 19 illustrates a flow chart of an exemplary method 1900 for generating a physical layout of an integrated circuit for fabrication, in accordance with some embodiments of the present disclosure. At operation 1902, a first library is provided comprising a plurality of first cells each has a first cell height and comprises a plurality of active regions continuously extending along a first direction. At operation 1904, a second library is provided comprising a plurality of second cells each has a second cell height different from the first cell height and comprises a plurality of active regions continuously extending along the first direction. At operation 1906, a first subset of the plurality of first cells is retrieved from the first library and a second subset of the plurality of second cells is retrieved from the second library. At operation 1908, the first subset of the plurality of first cells extending along the first direction is placed in a first plurality of cell rows, and the second subset of the plurality of second cells extending along the first direction is placed in a second plurality of cell rows. At operation 1910, a ratio is determined, e.g. based on a performance requirement of the integrated circuit, between a number of the first plurality of cell rows and a number of the second plurality of cell rows arranged along a second direction perpendicular to the first direction. At operation 1912, the first and second pluralities of cell rows are placed, based on the ratio, along the second direction to form a layout. At operation 1914, an integrated circuit is fabricated based on the layout. In one embodiment, a quantity of active regions, in each cell row of the first and second pluralities of cell rows, varies along the first direction. In various embodiments, the operations of the method 1900 are performed by the respective components illustrated in FIG. 3. According to various embodiments of the present disclosure, the order of the operations in FIG. 19 may be changed.

In an embodiment, an integrated circuit structure includes: a first plurality of cell rows extending in a first direction, each of which has a first row height and comprises a plurality of first cells disposed therein; and a second plurality of cell rows extending in the first direction, each of which has a second row height different from the first row height and comprises a plurality of second cells disposed therein. The plurality of first cells comprises a first plurality of active regions each of which continuously extends across the plurality of first cells in the first direction, and wherein the plurality of second cells comprises a second plurality of active regions each of which continuously extends across the plurality of second cells in the first direction.

In another embodiment, an integrated circuit structure includes: a plurality of first cells each having a first cell height, wherein a first subset of the plurality of first cells are disposed along a first direction in a first cell row; and a plurality of second cells each having a second cell height different from the first cell height, wherein a second subset of the plurality of second cells are disposed along the first direction in a second cell row different from the first cell row. The plurality of first cells each comprises a first plurality of active regions that each continuously extends across the first subset of the plurality of first cells, and wherein the plurality of second cells each comprises a second plurality of active regions that each continuously extends across the second subset of the plurality of second cells.

In yet another embodiment, an integrated circuit designing system includes: a non-transitory storage medium encoded with a set of instructions; and a hardware processor communicatively coupled with the non-transitory storage medium and configured to execute the set of instructions, the set of instructions being configured to cause the processor to: provide a first library comprising a plurality of first cells that each comprises a first plurality of active regions continuously extending along a first direction; provide a second library comprising a plurality of second cells that each comprises a second plurality of active regions continuously extending along the first direction, wherein respective numbers of the first and second pluralities of active regions are different from each other; retrieve a first subset of the plurality of first cells from the first library and/or a second subset of the plurality of second cells from the second library; and place the first subset of the plurality of first cells extending along the first direction in a first plurality of cell rows and/or the second subset of the plurality of second cells extending along the first direction in a second plurality of cell rows.

In an embodiment, an integrated circuit structure includes: a first plurality of cell rows extending in a first direction, and a second plurality of cell rows extending in the first direction. Each of the first plurality of cell rows has a first row height and comprises a plurality of first cells disposed therein. Each of the second plurality of cell rows has a second row height different from the first row height and comprises a plurality of second cells disposed therein. The plurality of first cells comprises a first plurality of active regions each of which continuously extends across the plurality of first cells in the first direction. The plurality of second cells comprises a second plurality of active regions each of which continuously extends across the plurality of second cells in the first direction. At least one active region of the first and second pluralities of active regions has a width varying along the first direction.

In a different embodiment, an integrated circuit structure includes: a first plurality of cell rows extending in a first direction, and a second plurality of cell rows extending in the first direction. Each of the first plurality of cell rows has a first row height and comprises a plurality of first cells disposed therein. Each of the second plurality of cell rows has a second row height different from the first row height and comprises a plurality of second cells disposed therein. Each of the plurality of first cells comprises a plurality of active regions each of which extends along the first direction with a fixed width. Each of the plurality of second cells comprises a plurality of active regions each of which extends along the first direction with the fixed width. A quantity of active regions, in at least one cell row of the first and second pluralities of cell rows, varies along the first direction.

In another embodiment, an integrated circuit designing system includes: a non-transitory storage medium encoded with a set of instructions; and a hardware processor communicatively coupled with the non-transitory storage medium and configured to execute the set of instructions, the set of instructions being configured to cause the processor to: provide a first library comprising a plurality of first cells that each has a first cell height and comprises a plurality of active regions continuously extending along a first direction, provide a second library comprising a plurality of second cells that each has a second cell height and comprises a plurality of active regions continuously extending along the first direction, wherein the second cell height is different from the first cell height, retrieve a first subset of the plurality of first cells from the first library and a second subset of the plurality of second cells from the second library, and place the first subset of the plurality of first cells extending along the first direction in a first plurality of cell rows and the second subset of the plurality of second cells extending along the first direction in a second plurality of cell rows. A quantity of active regions, in at least one cell row of the first and second pluralities of cell rows, varies along the first direction.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit structure, comprising:
a plurality of first cell rows extending in a first direction, wherein the first cell row comprises a first plurality of active regions each of which continuously extends across the first cell row in the first direction, and each of first plurality of active regions comprises a first fin of a fin field effect transistor (FinFET) and wherein a number of first fins changes along the first direction, wherein each of the plurality of first cell rows comprises a respective first plurality of cells disposed therein; and
a plurality of second cell rows extending in the first direction, wherein the second cell row comprises a second plurality of active regions each of which continuously extends across the second cell row in the first direction, and each of second plurality of active regions comprises a second fin of a FinFET and wherein a number of second fins changes along the first direction, wherein each of the plurality of second cell rows comprises a respective second plurality of cells disposed therein, wherein each cell of the plurality of first cell rows is vertically adjacent to at least one cell from the plurality of second cell rows, wherein at least two rows of the plurality of first cell rows have a first row height, a first row width, and a different number of cells, and wherein at least two rows of the plurality of second cell rows have a second row height different from the first row height, a second row width that is same as the first row width, and a different number of cells.

2. The integrated circuit structure of claim 1, wherein:
the number of first fins decreases along the first direction; and
the number of second fins increases along the first direction.

3. The integrated circuit structure of claim 2, wherein:
each of the plurality of first cell rows has the first row height, wherein for each first cell row of the plurality of first cell rows: each cell in the first cell row has a cell height equal to the first row height,
each of the plurality of second cell rows has the second row height, wherein for each second cell row of the plurality of second cell rows: each cell in the second cell row has a cell height equal to the second row height, and
a first quantity of the first plurality of active regions is associated with the first row height, and a second quantity of the second plurality of active regions is associated with the second row height.

4. The integrated circuit structure of claim 3, wherein the first quantity is different from the second quantity.

5. The integrated circuit structure of claim 2, wherein each of the first plurality of active regions is a p-type active region and each of the second plurality of active regions is an n-type active region.

6. The integrated circuit structure of claim 1, wherein the pluralities of first and second cell rows are arranged in an alternating configuration along a second direction perpendicular to the first direction, such that every two adjacent cell rows along the second direction comprise a first cell row and a second cell row.

7. The integrated circuit structure of claim 1, wherein the pluralities of first and second cell rows are mixed, along a second direction perpendicular to the first direction, according to a ratio between a number of the plurality of first cell rows and a number of the plurality of second cell rows.

8. A method, comprising:
providing a first library comprising a plurality of first cells that each comprises a first plurality of active regions extending along a first direction, wherein each of first plurality of active regions comprises a first fin of a fin field effect transistor (FinFET) and has a first row height and comprises a plurality of cells disposed therein, wherein for each first cell row of a plurality of first cell rows associated with the plurality of first cells: each cell in the first cell row has a cell height equal to the first row height;
providing a second library comprising a plurality of second cells that each comprises a second plurality of active regions extending along the first direction, wherein each of second plurality of active regions comprises a second fin of a FinFET and has a second row height different from the first row height and comprises a plurality of cells disposed therein, wherein for each second cell row of a plurality of second cell rows associated with the plurality of second cells: each cell in the second cell row has a cell height equal to the second row height, wherein each cell of the plurality of first cells is vertically adjacent to at least one cell from the plurality of second cells, wherein at least two rows of the plurality of first cell rows have the first row height, a first row width, and a different number of cells, and wherein at least two rows of the plurality of second cell rows have the second row height different from the first row height, a second row width that is same as the first row width, and a different number of cells;
retrieving a first subset of the plurality of first cells from the first library and a second subset of the plurality of second cells from the second library;
placing the first subset of the plurality of first cells extending along a first direction to form a first plurality of cell rows; and
placing the second subset of the plurality of second cells extending along the first direction to form a second plurality of cell rows.

9. The method of claim 8, wherein a first quantity of the first plurality of active regions is associated with the first cell height of the plurality of first cells, and a second quantity of the second plurality of active regions is associated with the second cell height of the plurality of second cells.

10. The method of claim 8, wherein:
each of the first plurality of active regions is a p-type active region and a number of first fins changes along the first direction; and
each of the second plurality of active regions is an n-type active region and a number of second fins changes along the first direction.

11. The method of claim 8, wherein:
in each of the first plurality of cell rows, the respective first pluralities of active regions of the first subset of the plurality of first cells continuously extend across the first subset of the plurality of first cells, and
in each of the second plurality of cell rows, the respective second pluralities of active regions of the second subset of the plurality of second cells continuously extend across the second subset of the plurality of second cells.

12. The method of claim 8, further comprising:
placing the first and second pluralities of cell rows along a second direction perpendicular to the first direction to form a layout of an integrated circuit.

13. The method of claim 12, further comprising:
based on a performance requirement of the integrated circuit, determining an arrangement of the first and second pluralities of cell rows along the second direction.

14. The method of claim 13, further comprising:
based on the performance requirement of the integrated circuit, determining a ratio of a number of the first plurality of cell rows to a number of the second plurality of cell rows arranged along the second direction.

15. The method of claim 14, wherein the ratio is one of the following: 1/2, 1/3, 1/4, 2/3, 3/2, 2/1, 3/1, 4/1, or 1/1.

16. A method, comprising:
providing a first library comprising a plurality of first cells that each comprise a first plurality of active regions continuously extending along a first direction, wherein each of first plurality of active regions comprises a first fin of a fin field effect transistor (FinFET) and wherein a number of first fins changes along the first direction;
providing a second library comprising a plurality of second cells that comprise a second plurality of active regions continuously extending along the first direction, wherein each of second plurality of active regions comprises a second fin of a FinFET, wherein a number of second fins changes along the first direction;
retrieving a first subset of the plurality of first cells from the first library and a second subset of the plurality of second cells from the second library;
placing the first subset of the plurality of first cells extending along the first direction to form a first plurality of cell rows; and
placing the second subset of the plurality of second cells extending along the first direction to form a second plurality of cell rows, wherein a quantity of active regions, in at least one cell row of the first and second pluralities of cell rows, varies along the first direction, wherein each of the second plurality of cell rows comprises a respective second plurality of cells disposed therein, wherein each cell of the first plurality of cell rows is vertically adjacent to at least one cell from the second plurality of cell rows, wherein at least two rows of the first plurality of cell rows have a first row height, a first row width, and a different number of cells, and wherein at least two rows of the second plurality of cell rows have a second row height different from the first row height, a second row width that is same as the first row width, and a different number of cells.

17. The method of claim 16, wherein:
a quantity of active regions, in each cell row of the first and second pluralities of cell rows, varies along the first direction.

18. The method of claim 16, further comprising:
based on a performance requirement of the integrated circuit, determining a ratio between a number of the first plurality of cell rows and a number of the second plurality of cell rows arranged along a second direction perpendicular to the first direction.

19. The method of claim 18, further comprising:
placing, based on the ratio, the first and second pluralities of cell rows along the second direction to form a layout of an integrated circuit.

20. Method of claim 18, wherein the ratio is one of the following: 1/2, 1/3, 1/4, 2/3, 3/2, 2/1, 3/1, 4/1, or 1/1.

* * * * *